US012688819B2

(12) United States Patent
Liu

(10) Patent No.: US 12,688,819 B2
(45) Date of Patent: Jul. 21, 2026

(54) ARRAY SUBSTRATE AND PREPARATION METHOD THEREOF, DISPLAY PANEL, AND DISPLAY DEVICE

(71) Applicant: Suzhou Govisionox Innovation Technology Co., Ltd., Kunshan (CN)

(72) Inventor: Yusheng Liu, Langfang (CN)

(73) Assignee: Suzhou Govisionox Innovation Technology Co., Ltd., Kunshan (CN)

( * ) Notice: Subject to any disclaimer, the term of this patent is extended or adjusted under 35 U.S.C. 154(b) by 0 days.

(21) Appl. No.: 18/979,517

(22) Filed: Dec. 12, 2024

(65) Prior Publication Data

US 2025/0111826 A1 Apr. 3, 2025

(30) Foreign Application Priority Data

Jan. 5, 2024 (CN) ......................... 202410020550.3

(51) Int. Cl.
*G09G 3/32* (2016.01)

(52) U.S. Cl.
CPC ........... *G09G 3/32* (2013.01); *G09G 2360/14* (2013.01)

(58) Field of Classification Search
CPC .......... G09F 9/33; G09F 9/335; G06F 3/0416; G06F 3/042; G09G 3/32; G09G 3/3233; G09G 2300/0426; G09G 2360/14; H10D 86/411; H10D 86/441; H10D 86/021; H10D 86/60
See application file for complete search history.

(56) References Cited

U.S. PATENT DOCUMENTS

| | | | | |
|---|---|---|---|---|
| 11,881,488 | B2 * | 1/2024 | Park | H01L 25/167 |
| 2022/0302202 | A1 * | 9/2022 | Lee | H01L 25/0753 |
| 2022/0320219 | A1 | 10/2022 | Zheng | |
| 2023/0134963 | A1 * | 5/2023 | Bok | G06F 3/0443 345/174 |

FOREIGN PATENT DOCUMENTS

| | | | |
|---|---|---|---|
| CN | 106855674 | A | 6/2017 |
| CN | 111341814 | A | 6/2020 |
| KR | 20230151583 | A | 11/2023 |

OTHER PUBLICATIONS

Request for the Submission of an Opinion of Korean Application No. KR 10-2024-0178308, May 19, 2025.

* cited by examiner

*Primary Examiner* — Muhammad N Edun
(74) *Attorney, Agent, or Firm* — Kilpatrick Townsend & Stockton LLP

(57) ABSTRACT

The present application provides an array substrate and a preparation method thereof, a display panel, and a display device. The array substrate includes a light-emitting driving circuit and a photoelectric sensing circuit. The light-emitting driving circuit includes at least one first trace, and the at least one first trace is configured to receive a first signal having at least two different potentials. The photoelectric sensing circuit is configured to receive a light signal and generate a corresponding photo-generated electrical signal according to the light signal. The photoelectric sensing circuit includes a sensing reading signal line, and the sensing reading signal line is configured to transmit the photo-generated electrical signal, wherein the at least one first trace and the sensing reading signal line are arranged in different layers.

17 Claims, 27 Drawing Sheets

ARRAY SUBSTRATE AND PREPARATION METHOD THEREOF, DISPLAY PANEL, AND DISPLAY DEVICE

CROSS-REFERENCE TO RELATED APPLICATIONS

This application claims priority to Chinese Patent Application No. 202410020550.3, titled "ARRAY SUBSTRATE AND PREPARATION METHOD THEREOF, DISPLAY PANEL, AND DISPLAY DEVICE" and filed on Jan. 5, 2024, which is hereby incorporated by reference in its entirety.

TECHNICAL FIELD

The present application relates to the technical field of display devices, and in particular to an array substrate and a preparation method thereof, a display panel, and a display device.

BACKGROUND

A display panel is an output device for presenting information in a visual form. Examples of devices having a display panel for displaying images are multimedia display devices such as televisions, mobile phones, tablet computers, navigation devices, and game consoles.

With the development of science and technology, people's requirements for display panels are also increasing day by day. In addition to satisfying the display function, display panels also need to have multiple functions such as touch and light recognition.

SUMMARY

The embodiments of the present application provide an array substrate and a preparation method thereof, a display panel, and a display device, which can improve the reliability of a photoelectric sensing circuit.

In a first aspect, an embodiment of the present application provides an array substrate, the array substrate comprises a plurality of light-emitting driving circuits, and a plurality of photoelectric sensing circuits, the light-emitting driving circuit comprises at least one first trace, and the at least one first trace is configured to receive a first signal having at least two different potentials. The photoelectric sensing circuit is configured to receive a light signal and generate a corresponding photo-generated electrical signal according to the light signal, the photoelectric sensing circuit comprises a sensing reading signal line, the sensing reading signal line is configured to transmit the photo-generated electrical signal, wherein the at least one first trace and the sensing reading signal line are arranged in different layers.

In some embodiments, the array substrate further comprises a substrate and a first metal layer located on a side of the substrate, the light-emitting driving circuit further comprises a driving transistor, wherein the first metal layer comprises a first power line, the first power line is coupled to a first electrode of the driving transistor, and the sensing reading signal line is located on a side of the first metal layer facing the substrate.

In some embodiments, the array substrate further comprises a first active layer and a second active layer, the first active layer is located on a side of the substrate facing the first metal layer, and the second active layer is located on a side of the first active layer facing the first metal layer, wherein the photoelectric sensing circuit further comprises a first transistor coupled to the sensing reading signal line, the first transistor comprises a first active structure located in the second active layer; and the driving transistor comprises a second active structure located in the first active layer.

In some embodiments, the array substrate further comprises a shielding layer, the shielding layer is located on a side of the first active layer facing the substrate and comprises a shielding trace, an orthographic projection of the shielding trace on the substrate covers an orthographic projection of a channel region of the second active structure on the substrate, and the sensing reading signal line is located in the shielding layer; or the driving transistor further comprises a driving control end, the array substrate further comprises a first gate layer, the sensing reading signal line and the driving control end are located in the first gate layer; or the array substrate further comprises a second gate layer, the photoelectric sensing circuit further comprises a sensing control signal line, the first transistor further comprises a first control end coupled to the sensing control signal line, and the sensing reading signal line and the first control end are located in the second gate layer.

In some embodiments, a material of the first active layer comprises low-temperature polysilicon, and a material of the second active layer comprises indium gallium zinc oxide.

In some embodiments, the array substrate further comprises a second metal layer, the light-emitting driving circuit further comprises a storage capacitor, the storage capacitor includes a first polar plate and a second polar plate that are arranged oppositely, the driving transistor further comprises a driving control end, the first polar plate is coupled to the driving control end, the first transistor further comprises a second control end, the second end is configured to adjust a threshold voltage of the first transistor, wherein the second control end and the second polar plate are located in the second metal layer.

In some embodiments, the at least one first trace is a data line and is located in the first metal layer.

In some embodiments, the array substrate further comprises a first active layer, the first active layer is located on a side of the substrate facing the first metal layer, wherein the photoelectric sensing circuit further comprises a first transistor coupled to the sensing reading signal line, the first transistor comprises a first active structure, the driving transistor comprises a second active structure, the first active structure and the second active structure are located in the first active layer.

In some embodiments, a material of the first active layer comprises low-temperature polysilicon.

In some embodiments, the array substrate further comprises a second metal layer, the light-emitting driving circuit further comprises a storage capacitor, the storage capacitor includes a first polar plate and a second polar plate that are arranged oppositely, the driving transistor further comprises a driving control end, the first polar plate is coupled to the driving control end, wherein the second polar plate and the sensing reading signal line are located in the second metal layer.

In some embodiments, the array substrate further comprises a shielding layer, the shielding layer is located on a side of the first active layer facing the substrate, and the sensing reading signal line is located in the shielding layer.

In some embodiments, the array substrate further comprises a first gate layer, the light-emitting driving circuit further comprises at least one switching transistor, the driving transistor further comprises the driving control end, the photoelectric sensing circuit further comprises a sensing control signal line, and the first transistor further comprises a first control end coupled to the sensing control signal line, wherein the at least one first trace comprises a plurality of first traces, the plurality of first traces comprises at least one of a scanning signal line and a light-emitting control line, and the scanning signal line is coupled to a control end of the switching transistor or the light-emitting control line is coupled to the control end of the switching transistor;

the at least one first trace, the driving control end and the first control end are located in the first gate layer.

In some embodiments, the array substrate further comprises a first gate layer, the driving transistor further comprises the driving control end, the photoelectric sensing circuit further comprises a sensing control signal line, and the first transistor further comprises the first control end coupled to the sensing control signal line, wherein the at least one first trace is the data line and is located in the first metal layer;

the sensing reading signal line, the driving control end, and the first control end are located in the first gate layer.

In some embodiments, the shielding layer comprises a shielding trace, and the orthographic projection of the shielding trace on the substrate covers the orthographic projection of the channel region of the second active structure on the substrate.

In some embodiments, the shielding trace is insulated from the light-emitting driving circuit, and the shielding trace is insulated from the photoelectric sensing circuit, and a material of the shielding layer comprises titanium and aluminum.

In some embodiments, the shielding trace is configured with a first power supply voltage.

In some embodiments, the photoelectric sensing circuit further comprises a first transistor, a first electrode of the first transistor is coupled to the sensing reading signal line, the first transistor comprises a first active structure, and a first doped region of the first active structure is coupled to the first electrode of the first transistor, wherein the photoelectric sensing circuit further comprises a first via and a second via, two ends of the first via are coupled to the first electrode of the first transistor and the first doped region of the first active structure respectively, and two ends of the second via are coupled to the first doped region of the first active structure and the sensing reading signal line respectively; or the photoelectric sensing circuit further comprises a third via, a fourth via, and a fifth via, two ends of the third via are coupled to the first electrode of the first transistor and the fourth via respectively, two ends of the fourth via are coupled to the third via and the sensing reading signal line respectively, and two ends of the fifth via are coupled to the first electrode of the first transistor and the first doped region of the first active structure respectively; or the photoelectric sensing circuit further comprises a sixth via, two ends of the sixth via are coupled to the first doped region of the first active structure and the sensing reading signal line respectively.

In some embodiments, an orthographic projection of the second via on the substrate is located within an orthographic projection of the first via on the substrate.

In some embodiments, an orthographic projection of the fourth via on the substrate is located within an orthographic projection of the third via on the substrate.

In some embodiments, an orthographic projection of the first electrode of the first transistor on the substrate and an orthographic projection of the sensing reading signal line on the substrate have an overlapping portion, and the orthographic projection of the first electrode of the first transistor on the substrate and an orthographic projection of the first doped region of the first active structure on the substrate have an overlapping portion, wherein the orthographic projection of the sensing reading signal line on the substrate and the orthographic projection of the first doped region of the first active structure on the substrate have an overlapping portion; or the orthographic projection of the sensing reading signal line on the substrate is located outside the orthographic projection of the first doped region of the first active structure on the substrate.

In some embodiments, the orthographic projection of the first electrode of the first transistor on the substrate, the orthographic projection of the first doped region of the first active structure on the substrate and the orthographic projection of the sensing reading signal line on the substrate have an overlapping portion.

In some embodiments, the photoelectric sensing circuit further comprises a second transistor, a control end of the second transistor is configured to receive and store photoelectric charges corresponding to the light signal, a first electrode of the second transistor is coupled to a first driving signal line, and the second transistor is configured to be driven by a first fixed voltage on the first driving signal line to output the photo-generated electrical signal corresponding to the photoelectric charges, wherein the first power line extends along a first direction, the first driving signal line extends along a second direction, and the first direction intersects with the second direction.

In some embodiments, the array substrate comprises a first active layer, the photoelectric sensing circuit further comprises a first transistor, the first transistor comprises a first active structure located in the first active layer, the first doped region of the first active structure is coupled to the sensing reading signal line, the second transistor comprises a third active structure located in the first active layer, and the first doped region of the third active structure is coupled to the first driving signal line, wherein the first active layer further comprises a conductor portion, the conductor portion is coupled to a second doped region of the first active structure and a second doped region of the third active structure.

In some embodiments, the conductor portion, the first active structure and the third active structure are in an integrated structure.

In some embodiments, the photoelectric sensing circuit further comprises a first transistor, and a first electrode of the first transistor is coupled to the sensing reading signal line, wherein the first driving signal line and the first electrode of the first transistor are arranged in a same layer.

In some embodiments, the photo-generated electrical signal has a first current value, the photoelectric charges have a second current value, the first current value and the second current value have a predetermined ratio, and the first current value is greater than the second current value.

In some embodiments, the array substrate further comprises a shielding structure arranged on the same layer as the at least one first trace, the shielding structure has a first orthographic projection on the substrate, and the sensing reading signal line has a second orthographic projection on the substrate, wherein the first orthographic projection and the second orthographic projection at least partially overlap; and/or, the at least one first trace has a third orthographic projection on the substrate, and at least part of the first orthographic projection is located between the second orthographic projection and the third orthographic projection.

In some embodiments, the light-emitting driving circuit further comprises a driving transistor, a first electrode of the driving transistor is coupled to a first power line, and the shielding structure and the first power line are configured with a same voltage value.

In some embodiments, the shielding structure and the first power line are arranged in a same layer.

In some embodiments, the array substrate has a first area and a second area arranged around a periphery side of the first area, the shielding structure comprises a plurality of first sub-portions and at least one second sub-portion, wherein the first sub-portions are at least partially arranged in the first area, the first sub-portions and the sensing reading signal line extend in a first direction, a plurality of the first sub-portions are arranged at intervals in a second direction, the first direction intersects with the second direction; and the second sub-portion is arranged in the second area, the second sub-portion extends along the second direction and is connected with a plurality of the first sub-portions.

In a second aspect, an embodiment of the present application provides a display panel, including the array substrate in any of the aforementioned embodiments.

In a third aspect, an embodiment of the present application provides a display device, including the display panel in any of the aforementioned embodiments.

In a fourth aspect, an embodiment of the present application provides a method for preparing an array substrate, including:

forming a sensing reading signal line of a photoelectric sensing circuit on a side of the substrate, wherein the photoelectric sensing circuit is configured to receive a light signal and generate a corresponding photo-generated electrical signal according to the light signal, and the sensing reading signal line is configured to transmit the photo-generated electrical signal; and forming at least one first trace of a light-emitting driving circuit on a side of the sensing reading signal line facing away from or toward the substrate, wherein the at least one first trace is configured to receive a first signal having at least two different potentials.

In some embodiments, prior to the forming at least one first trace of a light-emitting driving circuit on a side of the sensing reading signal line facing away from or toward the substrate, the method further comprises:

forming a first active structure of a first transistor in the photoelectric sensing circuit on the side of the sensing reading signal line facing away from the substrate, and coupling a first doped region of the first active structure with the sensing reading signal line.

In some embodiments, the forming a first active structure of a first transistor in the photoelectric sensing circuit on the side of the sensing reading signal line facing away from the substrate and coupling a first doped region of the first active structure with the sensing reading signal line comprises:

forming the first active structure on the side of the sensing reading signal line facing away from the substrate, wherein an orthographic projection of the first doped region of the first active structure on the substrate overlaps an orthographic projection of the sensing reading signal line on the substrate;

forming a first insulating layer on a side of the first active structure facing away from the substrate;

etching the first insulating layer to form a first via penetrating through the first insulating layer and being connected to the first doped region of the first active structure, and a second via connecting the first via and the sensing reading signal line;

forming the first electrode of the first transistor on a side of the first insulating layer facing away from the substrate, and coupling the first electrode of the first transistor to the first doped region and the sensing reading signal line through the first via and the second via.

In some embodiments, the forming a first active structure of a first transistor in the photoelectric sensing circuit on the side of the sensing reading signal line facing away from the substrate, and coupling a first doped region of the first active structure with the sensing reading signal line comprises:

forming the first active structure on the side of the sensing reading signal line facing away from the substrate, wherein the orthographic projection of the sensing reading signal line on the substrate is at least partially located outside an orthographic projection of the first active structure on the substrate;

forming the first insulating layer on the side of the first active structure facing away from the substrate;

etching the first insulating layer to form a third via penetrating through the first insulating layer, a fifth via penetrating through the first insulating layer and being connected to the first doped region of the first active structure, and a fourth via connecting the third via and the sensing reading signal line, and an orthographic projection of the third via on the substrate is located outside the orthographic projection of the first active structure on the substrate;

forming the first electrode of the first transistor on the side of the first insulating layer facing away from the substrate, coupling the first electrode of the first transistor to the sensing reading signal line through the third via and the fourth via, and coupling the first electrode of the first transistor to the first doped region of the first active structure through the fifth via.

In some embodiments, the forming a first active structure of a first transistor in the photoelectric sensing circuit on the side of the sensing reading signal line facing away from the substrate, and coupling a first doped region of the first active structure with the sensing reading signal line comprises:

forming a second insulating layer on the side of the sensing reading signal line facing away from the substrate;

etching the second insulating layer to form a sixth via connected to the sensing reading signal line;

forming the first active structure on the side of the second insulating layer facing away from the substrate, and coupling the first doped region of the first active structure to the sensing reading signal line through the sixth via.

The embodiments of the present application provide an array substrate and a preparation method thereof, a display panel, and a display device. By changing a relative position relationship between at least one first trace and a sensing reading signal line, the at least one first trace and the sensing reading signal line are arranged in different layers, that is, the at least one first trace and the sensing reading signal line are located in different film layers. In this way, the at least one first trace and the sensing reading signal line can have a certain interval in the thickness direction of the array substrate, so as to reduce the coupling capacitance between the at least one first trace and the sensing reading signal line, thereby reducing the influence of the voltage jump corresponding to the at least one first trace on the sensing reading signal line, improving the reliability of signal transmission in the sensing reading signal line, and improving the corresponding light-sensing accuracy of the display panel.

BRIEF DESCRIPTION OF THE DRAWINGS

In order to more clearly illustrate the technical solutions of the embodiments of the present application, the drawings required for use will be introduced briefly in the embodiments of the present application below. Those skilled in the art may also obtain other drawings based on these drawings without creative work.

REFERENCE NUMBERS

Figure 1:
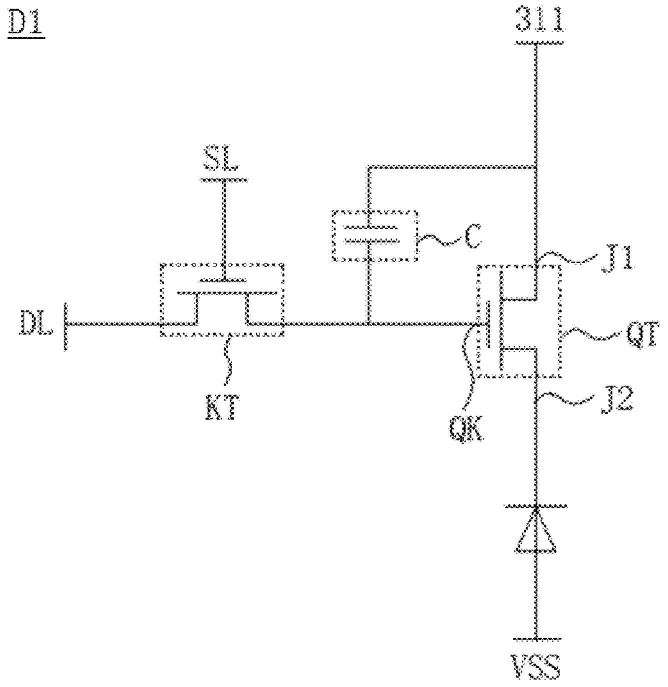
FIG. 1 is a schematic structural diagram of a circuit of a light-emitting driving circuit in an array substrate provided in an embodiment of the present application.

- 10, substrate;
- 21, first metal layer; 211, first power line; 22, second metal layer;
- 31, first active layer; 311, conductor portion; 32, second active layer;
- 40, shielding layer; 41, shielding trace;
- 51, first gate layer; 52, second gate layer;
- 61, first insulating layer; 62, second insulating layer;
- D1, light-emitting driving circuit; D2, photoelectric sensing circuit;
- L1, first trace; L2, sensing reading signal line; L3, first driving signal line; L4, sensing control signal line;
- DL, data line; SL, scanning signal line;
- QT, driving transistor; QK, driving control end; Y2, second active structure; KT, switching transistor; T1, first transistor; K1, first control end; K2, second control end; Y1, first active structure; T2, second transistor; Y3, third active structure; T3, third transistor;
- C, storage capacitor; C1, first polar plate; C2, second polar plate;

J1, first electrode; J2, second electrode; K, control end;
G, channel region; Z1, first doped region; Z2, second doped region;
B, shielding structure; B1, first sub-portion; B2, second sub-portion;
H1, first via; H2, second via; H3, third via; H4, fourth via; H5, fifth via; H6, sixth via;
A1, first area; A2, second area;
X, first direction; Y, second direction; Z, thickness direction.

DETAILED DESCRIPTION

The features and exemplary embodiments of various aspects of the present application will be described in detail below. In order to make the purpose, technical solutions and advantages of the present application clearer, the present application will be further described in detail below in conjunction with the drawings and specific embodiments. It should be understood that the specific embodiments described herein are only intended to explain the present application, rather than to limit the present application. For those skilled in the art, the present application can be implemented without the need for some of these specific details. The following description of the embodiments is only to provide a better understanding of the present application by illustrating the examples of the present application.

It should be noted that, in the present application, relational terms such as first and second, etc. are only used to distinguish one entity or operation from another entity or operation, and do not necessarily require or imply that there is any such actual relationship or order between these entities or operations. Moreover, the terms "include", "comprise" or any other variant thereof are intended to cover non-exclusive inclusion, so that a process, method, article or device including a series of elements includes not only those elements, but also other elements that are not explicitly listed, or includes elements inherent to such a process, method, article or device. In the absence of further restrictions, the elements defined by the sentence "include . . . " do not exclude the existence of other identical elements in the process, method, article or device including the elements.

In a display panel, in addition to the display function, the display panel also needs to have one or more light-sensing functions such as fingerprint recognition. On this basis, the display panel needs to include at least two circuit structures, namely, a light-emitting driving circuit and a photoelectric sensing circuit. Herein, the light-emitting driving circuit is a circuit for realizing the light-emitting function, and the photoelectric sensing circuit is a circuit suitable for realizing the light-sensing function. However, due to the limitation of the internal space of the display panel, the light-emitting driving circuit and the photoelectric sensing circuit are prone to mutual interference, which is conducive to having an adverse effect on the light-sensing function of the display panel.

In view of this, in a first aspect, referring to FIG. 1 to FIG. 4, embodiments of the present application provide an array substrate, the array substrate includes a light-emitting driving circuit D1 and a photoelectric sensing circuit D2. The light-emitting driving circuit D1 includes at least one first trace L1, and the at least one first trace L1 is configured to receive a first signal with at least two different potentials. The photoelectric sensing circuit D2 is configured to receive a light signal and generate a corresponding photo-generated electrical signal according to the light signal. The photoelectric sensing circuit D2 includes a sensing reading signal line L2, and the sensing reading signal line L2 is configured to transmit the photo-generated electrical signal. Herein, the at least one first trace L1 and the sensing reading signal line L2 are arranged in different layers.

The array substrate is used to form a display panel in a subsequent process, wherein the display panel mentioned in the embodiments of the present application may have a light-sensing function in addition to the display function. Specifically, the display panel can sense ambient light to realize various functions such as fingerprint recognition, face recognition, and brightness adjustment.

A plurality of film layer structures stacked in layers may be included inside the array substrate, and in the embodiments of the present application, there is no limitation on the specific film layer composition of the array substrate. Optionally, the array substrate may include a plurality of conductive layers stacked in layers and an insulating layer located between adjacent conductive layers.

The array substrate includes at least two circuit structures, namely, a light-emitting driving circuit D1 and a photoelectric sensing circuit D2. The light-emitting driving circuit D1 is a circuit for realizing the display function. The light-emitting driving circuit D1 has various forms, which are not limited in the embodiments of the present application. Exemplarily, the light-emitting driving circuit D1 may be in a form of a 2T1C structure, or may be in a form of a 7T1C or 8T1C structure.

The photoelectric sensing circuit D2 is a circuit for realizing the light-sensing function, and the photoelectric sensing circuit D2 is configured to receive a light signal and generate a corresponding photo-generated electrical signal according to the light signal. The light signal mentioned herein may be a signal corresponding to the external ambient light, and the photoelectric sensing circuit D2 can convert the corresponding light signal into a photo-generated electrical signal. In other words, the photoelectric sensing circuit D2 can convert the received light signal into a corresponding electrical signal, and then process the electrical signal to realize light-sensing functions such as fingerprint recognition, face recognition, and brightness adjustment.

The light-emitting driving circuit D1 includes at least one first trace L1, and the at least one first trace L1 is configured to receive a first signal. In the embodiments of the present application, there is no limitation on the types of the at least one first trace L1 and the first signal, as long as it is satisfied that the first signal received by the at least one first trace L1 can have two or more potentials in different time zones. Exemplarily, the at least one first trace L1 may be a data line DL, and the first signal is to transmit a data signal; or the at least one first trace L1 may be a scanning line, and the first signal is to transmit a scanning signal.

The photoelectric sensing circuit D2 includes a sensing reading signal line L2, and the sensing reading signal line L2 is configured to transmit the photo-generated electrical signal. In the related art, the sensing reading signal line in the photoelectric sensing circuit is arranged in the same layer as the at least one first trace in the light-emitting driving circuit, that is, the sensing reading signal line may be located in the same film layer as the at least one first trace, and the wiring line in this film layer is relatively crowded, which may cause a distance between the photosensitive reading signal line and the at least one first trace to be too close, thereby causing the coupling capacitance between the photosensitive reading signal line and the at least one first trace to be large.

Furthermore, since the first signal transmitted by the at least one first trace L1 has at least two potentials, when a voltage of the at least one first trace L1 jumps, the existence of the coupling capacitor may cause the voltage on the photosensitive reading signal line to change, thereby inducing noise and causing the occurrence of problems such as abnormal sensing of the light signal.

In view of this, the embodiments of the present application changes the relative position relationship between the at least one first trace L1 and the sensing reading signal line L2, so that the at least one first trace L1 and the sensing reading signal line L2 are arranged in different layers, that is, the at least one first trace L1 and the sensing reading signal line L2 are located in different film layers, so that the at least one first trace L1 and the sensing reading signal line L2 can have a certain interval in a thickness direction Z of the array substrate, so as to reduce the coupling capacitance between the at least one first trace L1 and the sensing reading signal line L2, thereby reducing the influence of the voltage jump corresponding to the at least one first trace L1 on the sensing reading signal line L2, improving the reliability of signal transmission in the sensing reading signal line L2, and improving the corresponding light-sensing accuracy of the display panel.

In some embodiments, referring to FIG. 1 to FIG. 6, the array substrate also includes a substrate 10 and a first metal layer 21 located on one side of the substrate 10, and the light-emitting driving circuit D1 also includes a driving transistor QT, wherein the first metal layer 21 includes a first power line 211, the first power line 211 is coupled to a first electrode J1 of the driving transistor QT, and the sensing reading signal line L2 is located on one side of the first metal layer 21 facing the substrate 10.

The light-emitting driving circuit D1 includes a driving transistor QT and a switching transistor KT. The number and layout of the driving transistors QT and the switching transistors KT in the light-emitting driving circuit D1 are not limited in the embodiments of the present application. The switching transistor KT and the driving transistor QT are both thin film transistors (TFT), which may be a low-temperature polysilicon thin film transistor or an oxide thin film transistor. Further, each transistor includes a first electrode J1, a second electrode J2 and a control end, and the control end is configured at least to control the first electrode J1 and the second electrode J2 to be turned on or off.

Figure 3:
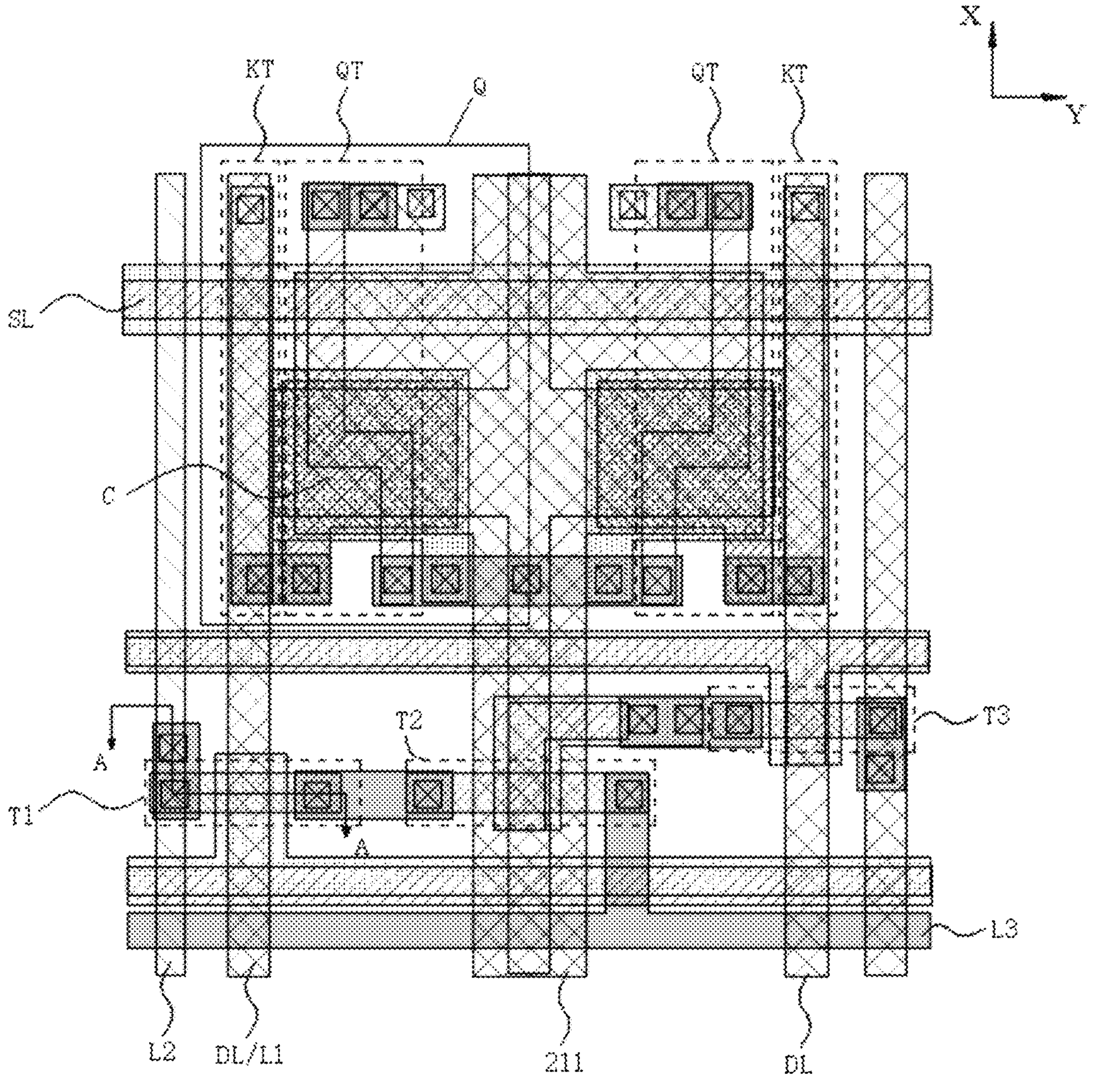
FIG. 3 is a schematic structural diagram of a local layout in the array substrate provided in an embodiment of the present application.

It should be noted that although FIG. 1 shows that the light-emitting driving circuit D1 is in the form of 2T1C structure, according to different actual conditions, the light-emitting driving circuit D1 may also be in the form of 7T1C or 8T1C structure, etc., which is not limited in the embodiments of the present application. In addition, FIG. 3 shows two light-emitting driving circuits D1 corresponding to two light-emitting structures, and the two light-emitting driving circuits D1 may be symmetrically arranged.

The first metal layer 21 includes a first power line 211, and the first power line 211 is coupled to the first electrode J1 of the driving transistor QT. The first power line 211 is configured to transmit a power signal. Optionally, the first power line 211 is configured to transmit a power signal. Exemplarily, the first power line 211 is configured to transmit a VDD signal. Further, in the embodiments of the present application, the sensing reading signal line L2 is arranged on one side of the first metal layer 21 facing the substrate 10, so that the sensing reading signal line L2 and the first power line 211 are located in different film layers, so as to reduce the mutual influence between the two signals, thereby improving the reliability of the operation of each of the light-emitting driving circuits D1 and the photoelectric sensing circuits D2, and improving the corresponding light-sensing accuracy of the display panel.

In some embodiments, as shown in FIG. 1 to FIG. 6, the array substrate also includes a first active layer 31 and a second active layer 32, the first active layer 31 is located on one side of the substrate 10 facing the first metal layer 21, and the second active layer 32 is located on one side of the first active layer 31 facing the first metal layer 21, wherein the photoelectric sensing circuit D2 also includes a first transistor T1 coupled to the sensing reading signal line L2, the first transistor T1 includes a first active structure Y1 located in the second active layer 32, and the driving transistor QT includes a second active structure Y2 located in the first active layer 31.

The array substrate in the embodiments of the present application include two different active layer structures at the same time, and the two active layers may include different materials, that is, LTPO (Low Temperature Polysilicon Oxide, low temperature polycrystalline silicon oxide) technology may be applied to the embodiments of the present application. Specifically, LTPO technology is a mixed product of LTPS (Low Temperature Poly-Silicon, low temperature polycrystalline silicon)-TFT and IGZO (Indium Gallium Zinc Oxide, indium gallium zinc oxide)-TFT, wherein LTPS-TFT is a transistor using low temperature polycrystalline silicon as an active layer, and IGZO-TFT is a transistor using metal oxide as an active layer.

LTPS-TFT has better switching speed, fast response, and stronger current driving capability. IGZO-TFT has low leakage and high uniformity. Considering the characteristics of the two, exemplarily, IGZO-TFT is more suitable for a switching transistor coupled to the driving control end in the driving transistor QT, while the driving transistor QT is more suitable for LTPS-TFT.

On this basis, in the embodiments of the present application, the types of the first transistor T1 and the driving transistor QT are controlled for the different functions corresponding to the first transistor T1 in the photoelectric sensing circuit D2 and the driving transistor QT in the light-emitting driving circuit D1, so that the first active structure Y1 in the first transistor T1 is located in the second active layer 32, and the second active structure Y2 in the driving transistor QT is located in the first active layer 31, that is, the first active structure Y1 and the second active structure Y2 are made of different materials, so as to improve the corresponding operation reliability of the first transistor T1 and the driving transistor QT.

The material compositions of the first active layer 31 and the second active layer 32 are not limited in the embodiments of the present application. Optionally, the material of the first active layer 31 includes low-temperature polysilicon, and the material of the second active layer 32 includes indium gallium zinc oxide. That is, the first transistor T1 may be an IGZO-TFT, and the driving transistor QT is an LTPS-TFT.

During the operation of the photoelectric sensing circuit D2, the photoelectric sensing circuit D2 often requires higher sensing accuracy, and the first transistor T1 is set as an IGZO-TFT, which is conducive to reducing the overall current leakage of the photoelectric sensing circuit D2 and improving the sensing accuracy.

Further, optionally, the at least one first trace L1 includes a data line DL, and the first signal line includes a data signal. In traditional LTPO technology, the sensing reading signal line L2 is usually located in the same film layer as the data line DL, so that the voltage jump in the data line DL may have an adverse effect on the sensing reading signal line L2.

In view of this, in the embodiments of the present application, the sensing reading signal line L2 and the data line DL are arranged in different film layers to reduce the influence of the data line DL on the sensing reading signal line L2. The specific film layer position of the sensing reading signal line L2 is not limited in the embodiments of the present application. Further, optionally, the data line DL may be located in the first metal layer 21.

In some embodiments, the array substrate further includes a shielding layer 40, the shielding layer 40 is located on one side of the first active layer 31 facing the substrate 10, the shielding layer 40 includes a shielding trace 41, an orthographic projection of the shielding trace 41 on the substrate 10 covers an orthographic projection of a channel region G of the second active structure Y2 on the substrate 10, and the sensing reading signal line L2 is located in the shielding layer 40.

For the transistor structure, the active structure in the transistor includes a plurality of partitions, specifically, the active structure includes a channel region G and a first doped region Z1 and a second doped region Z2 located on both sides of the channel region G, the first electrode J1 in the transistor can be connected to the first doped region Z1 by means of a via, the second electrode J2 can be connected to the second doped region Z2 by means of a via, and then the transistor is connected to other external conductor or semiconductor structures by means of the first electrode J1 and the second electrode J2. Alternatively, in some transistors, at least one of the first electrode J1 and the second electrode J2 may be eliminated, and the first doped region Z1 or the second doped region Z2 may be directly used to connect with other external conductor or semiconductor structures, which is not limited in the embodiments of the present application.

The shielding layer 40 is located on one side of the first active layer 31 facing the substrate 10, and the shielding layer 40 includes a shielding trace 41, the shielding trace 41 overlaps an orthographic projection of the channel region G in the second active structure Y2 on the substrate 10. The shielding trace 41 may be used to avoid the formation of capacitance between the charge existing in the substrate 10 (for example, a flexible PI substrate) and the channel region G of the second active structure Y2 in the driving transistor QT, thereby reducing the risk of leakage of the driving transistor QT, and improving the operating reliability of the driving transistor QT.

The material composition of the shielding trace 41 is not limited in the embodiments of the present application. Optionally, the shielding trace 41 includes a metal material. Further, according to different actual needs, a potential (e.g., a VDD signal is configured for the shielding trace 41) may be configured in the shielding trace 41 to ensure the stability of the operation of the driving transistor QT, or the shielding trace 41 may not be configured with a potential.

Further, in the embodiments of the present application, the sensing reading signal line L2 is arranged in the shielding layer 40, while the at least one first trace L1 is not located in the shielding layer 40, and compared with other film layers, the shielding layer 40 is usually farther away from the film layer where the at least one first trace L1 is located, so that the at least one first trace L1 and the sensing reading signal line L2 can have a certain distance in the thickness direction Z of the array substrate, thereby reducing the influence of the voltage jump corresponding to the at least one first trace L1 on the sensing reading signal line L2, and improving the reliability of signal transmission in the sensing reading signal line L2.

Or, in other embodiments, the driving transistor QT also includes a driving control end QK, the array substrate also includes a first gate layer 51, and the sensing reading signal line L2 and the driving control end QK are located in the first gate layer 51.

The driving control end QK is a control end corresponding to the driving transistor QT, and the driving control end QK is located in the first gate layer 51. Optionally, the first gate layer 51 is located between the first active layer 31 and the second active layer 32. Further, in the embodiments of the present application, the sensing reading signal line L2 may be arranged in the first gate layer 51, so that the at least one first trace L1 and the sensing reading signal line L2 can be spaced apart in the thickness direction Z of the array substrate, thereby reducing the influence of the voltage jump corresponding to the at least one first trace L1 on the sensing reading signal line L2, and improving the reliability of signal transmission in the sensing reading signal line L2. Optionally, the sensing reading signal line L2 and the driving control end QK may include the same material so that the two can be formed together in the same preparation process.

Figure 2:
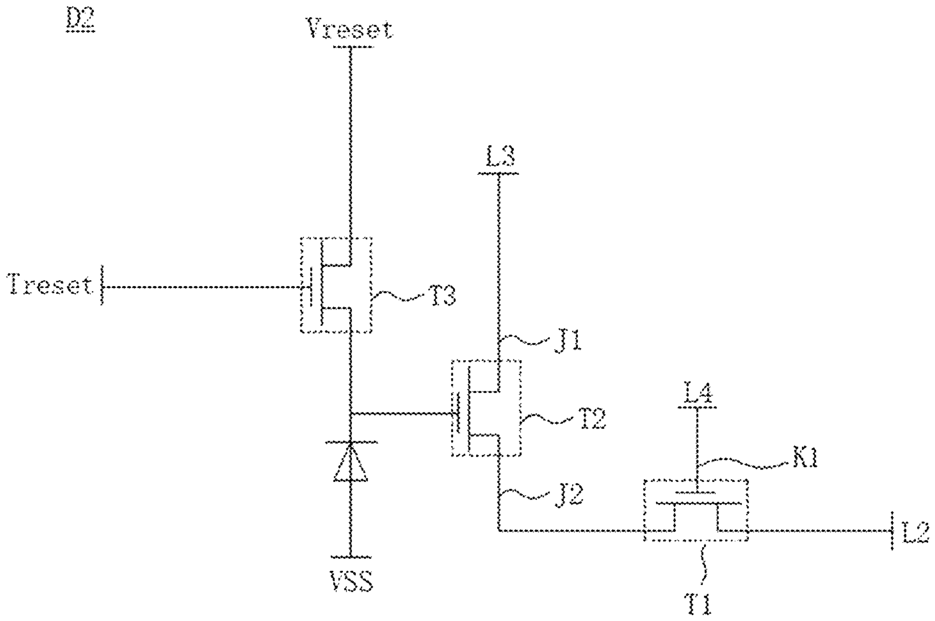
FIG. 2 is a schematic structural diagram of a circuit of a photoelectric sensing circuit in the array substrate provided in an embodiment of the present application.
Figure 7:
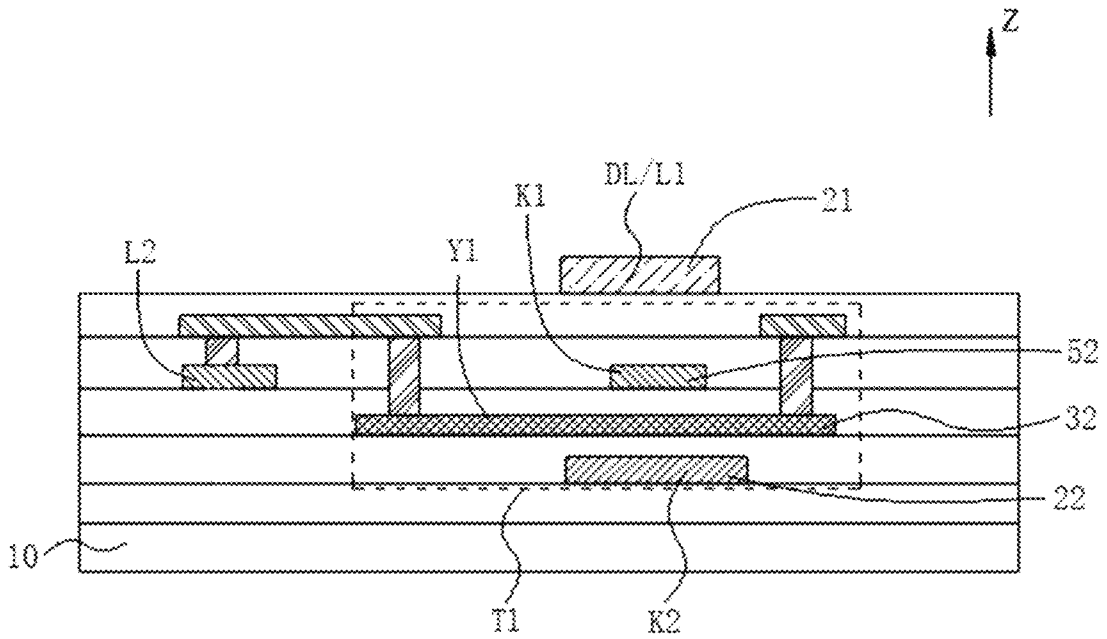
FIG. 7 is a schematic structural cross-sectional view of another array substrate provided in an embodiment of the present application.

Or, in other embodiments, referring to FIG. 2 and FIG. 7, the array substrate also includes a first gate layer 52, the photoelectric sensing circuit D2 also includes a sensing control signal line L4, the first transistor T1 also includes a first control end K1 coupled to the sensing control signal line L4, and the sensing reading signal line L2 and the first control end K1 are located in the first gate layer 52.

The first control end K1 is a control end corresponding to the first transistor T1. The first control end K1 is configured to receive the sensing control signal transmitted by the sensing control signal line L4, so as to realize the control of turn-on or turn-off of the first transistor T1. The first control end K1 is located in the first gate layer 52. Optionally, the first gate layer 52 is located between the second active layer 32 and the first metal layer 21.

Further, in the embodiments of the present application, the sensing reading signal line L2 may be arranged in the first gate layer 52, so that the at least one first trace L1 and the sensing reading signal line L2 can be spaced apart in the thickness direction Z of the array substrate, thereby reducing the influence of the voltage jump corresponding to the at least one first trace L1 on the sensing reading signal line L2, and improving the reliability of signal transmission in the sensing reading signal line L2. Optionally, the sensing reading signal line L2 and the first control end K1 may include the same material so that the two can be formed together in the same preparation process.

It should be noted that, since the technical solution in the embodiments of the present application is adapted to LTPO technology, the array substrate may have two different gate film layers, namely the first gate layer 51 and the first gate layer 52. On this basis, the control ends in different transistors can be arranged in the first gate layer 51 and the first gate layer 52 respectively, and other conductor structures may also be arranged in the first gate layer 51 and the first gate layer 52 respectively. Compared with the solution that the array substrate includes only one gate layer, it is conducive to reducing the distribution density of the conductor structures inside the first gate layer 51 and the first gate layer 52, and even if the sensing reading signal line L2 is arranged in the first gate layer 51 or the first gate layer 52, the sensing reading signal line L2 can also be spaced from other conductor structures that may occur voltage jump and are arranged in the same layer at a certain distance, so as to improve the reliability of signal transmission in the sensing reading signal line L2.

In addition, the array substrate may also include a photosensitive driving chip, and the sensing reading signal line L2 is connected to the photosensitive driving chip, wherein the photosensitive driving chip may be arranged at one end of the sensing reading signal line L2 in an extension direction. Furthermore, since the sensing reading signal line L2 and the at least one first trace L1 are located in different film layers, the extension direction of the sensing reading signal line L2 may be the same as or different from an extension direction of the at least one first trace L1. Taking the at least one first trace L1 including the data line DL as an example, the array substrate may further include a light-emitting driving chip, the light-emitting driving chip may be located at one end of the at least one first trace L1 in the extension direction, and according to the different extension directions of the sensing reading signal line L2, the photosensitive driving chip and the light-emitting driving chip may be located at the same side edge position of the array substrate, or may be located at different side edge positions.

In some embodiments, the array substrate further includes a second metal layer 22, the light-emitting driving circuit D1 further includes a storage capacitor C, the storage capacitor C includes a first polar plate C1 and a second polar plate C2 that are arranged oppositely, the first polar plate C1 is coupled to the driving control end QK, and the first transistor T1 further includes a second control end configured to adjust the threshold voltage of the first transistor T1, wherein the second control end and the second polar plate C2 are located in the second metal layer 22.

The first transistor T1 also includes two control ends, namely, a first control end K1 and a second control end, and the first control end K1 and the second control end K2 are arranged on both sides of the first active structure Y1 in the thickness direction Z of the array substrate respectively. The first control end K1 is mainly used to control the first transistor T1 to be turned on and off, and the second control end K2 is used to assist the first control end K1 in adjustment, which can effectively reduce leakage and improve the performance strength of the first transistor T1.

The storage capacitor C includes two polar plates, and the driving control end QK of the driving transistor QT may be coupled to the first polar plate C1. Further, the driving control end QK may be also used as the first polar plate C1. The second polar plate C2 and the second control end K2 are both located in the second metal layer 22, that is, the second polar plate C2 and the second control end K2 are arranged in the same layer. Optionally, the second polar plate C2 and the second control end K2 may include the same material and be prepared and formed together in the same preparation process.

Figure 8:
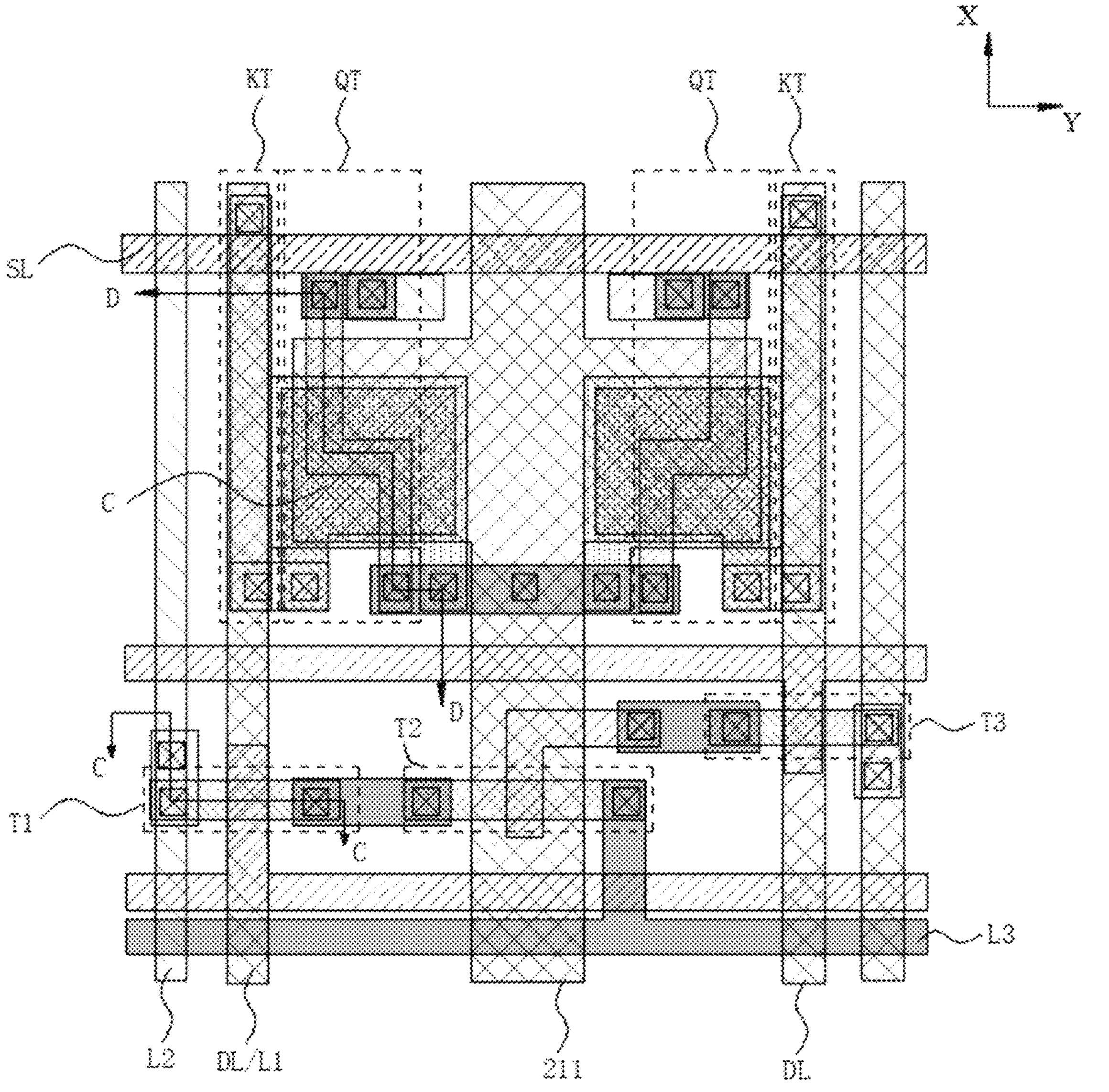
FIG. 8 is a schematic structural diagram of a local layout in another array substrate provided in an embodiment of the present application.
Figure 9:
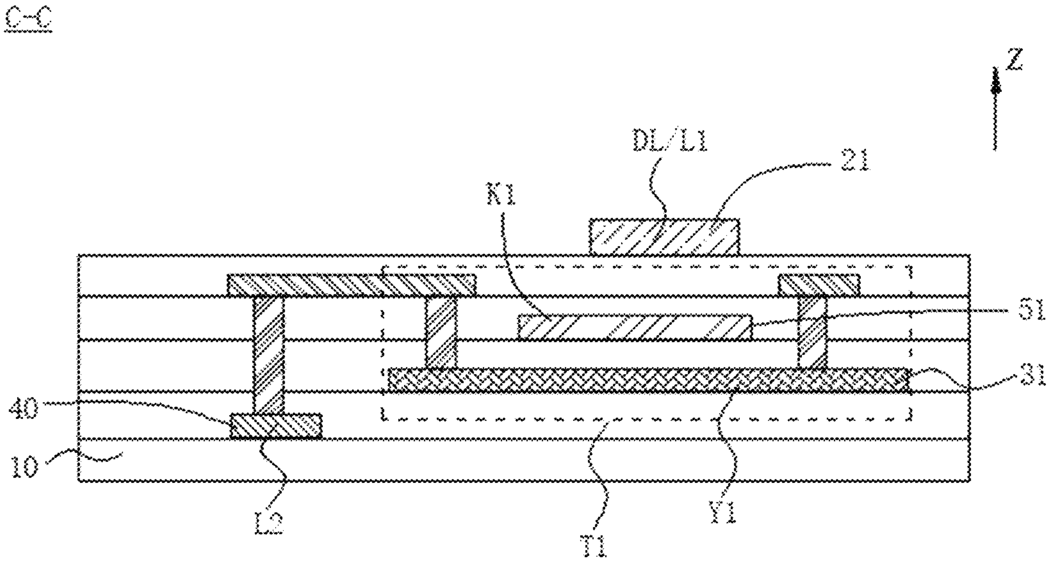
FIG. 9 is a schematic structural cross-sectional view at C-C in FIG. 8.
Figure 10:
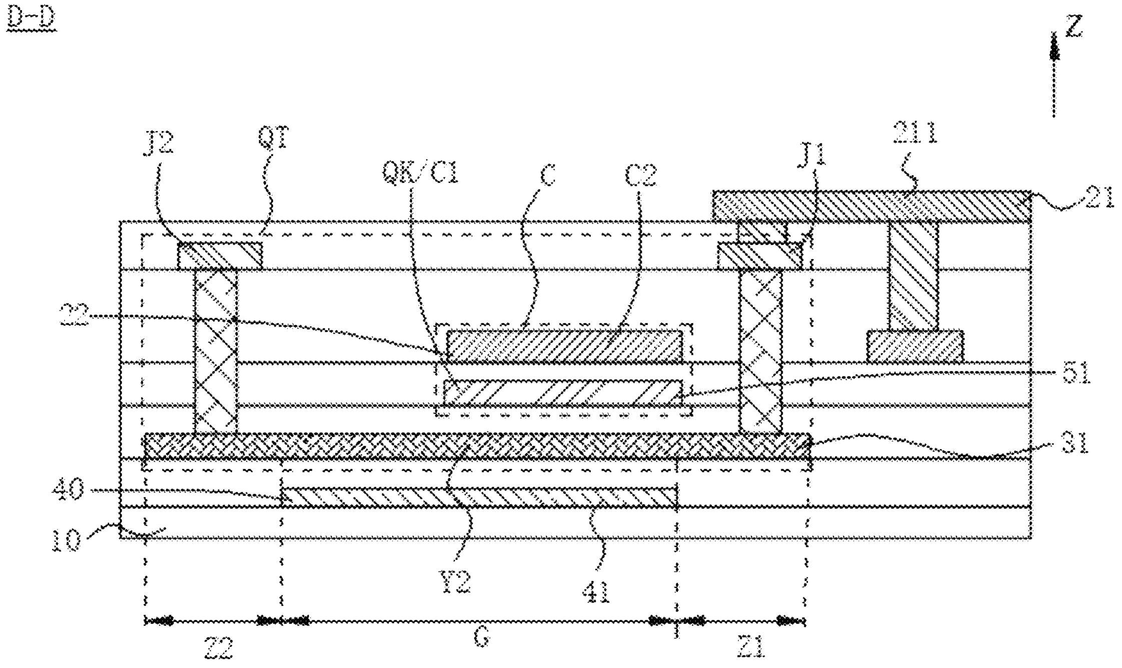
FIG. 10 is a schematic structural cross-sectional view at D-D in FIG. 8.

In some embodiments, referring to FIG. 8 to FIG. 10, the array substrate also includes a first active layer 31, and the first active layer 31 is located on one side of the substrate 10 facing the first metal layer 21. Herein, the photoelectric sensing circuit D2 also includes a first transistor T1 coupled to the sensing reading signal line L2, the first transistor T1 includes a first active structure Y1, and the driving transistor QT includes a second active structure Y2. The first active structure Y1 and the second active structure Y2 are located in the first active layer 31.

The array substrate in the embodiments of the present application includes only one active layer structure, that is, LTPS technology may be applied to the embodiments of the present application. Specifically, the LTPS technology includes only LTPS-TFT, that is, the array substrate includes only transistors using low-temperature polysilicon as an active layer.

The first active structure Y1 in the first transistor T1 and the second active structure Y2 in the driving transistor QT are both located in the first active layer 31. On this basis, the first active structure Y1 and the second active structure Y2 may include the same material and be prepared and formed together in the same preparation process, so as to improve the preparation efficiency corresponding to the array substrate.

The material composition of the first active layer 31 is not limited in the embodiments of the present application. Optionally, the material of the first active layer 31 includes low-temperature polysilicon.

It should be noted that the types of the at least one first trace L1 and the first signal line are not limited in the embodiments of the present application. Depending on the situation, in the traditional LTPS technology, the sensing reading signal line L2 may be in the same layer as the data line DL, and the data line DL may have a voltage jump. At this time, the at least one first trace L1 may include the data line DL. Or the sensing reading signal line L2 may be arranged in the same layer as the scanning signal line SL or the light-emitting control line EL, and the scanning signal line SL and the light-emitting control line EL may also have a voltage jump. At this time, the at least one first trace L1 may include the scanning signal line SL and the light-emitting control line EL.

Figure 11:
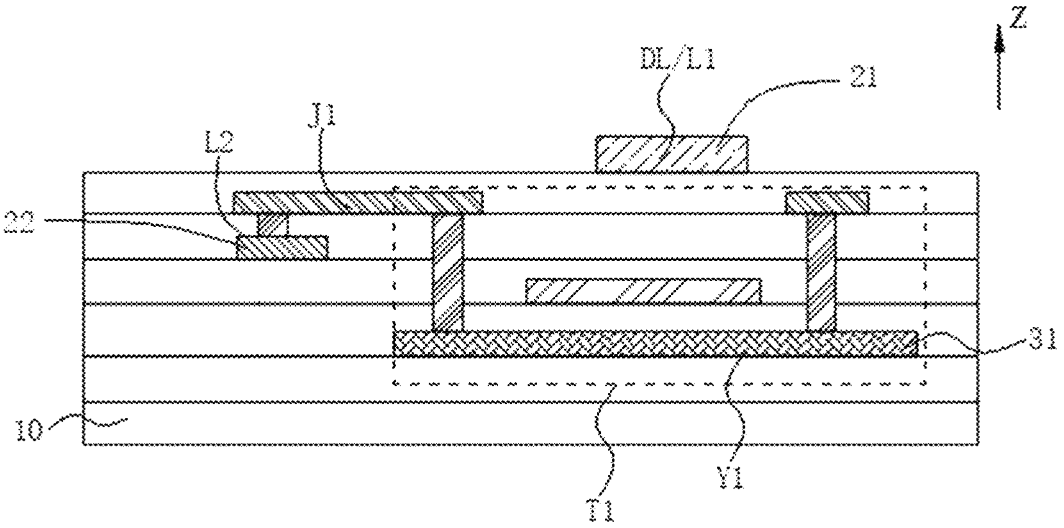
FIG. 11 is a schematic structural cross-sectional view of another array substrate provided in an embodiment of the present application.

In some embodiments, referring to FIG. 10 and FIG. 11, the array substrate also includes a second metal layer 22, the light-emitting driving circuit D1 also includes a storage capacitor C, the storage capacitor C includes a first polar plate C1 and a second polar plate C2 that are arranged oppositely, the driving transistor QT also includes a driving control end QK, and the first polar plate C1 is coupled to the driving control end QK. The second polar plate C2 and the sensing reading signal line L2 are located in the second metal layer 22.

In the embodiments of the present application, by disposing the second polar plate C2 and the sensing reading signal line L2 in the second metal layer 22, the second polar plate C2 and the sensing reading signal line L2 are located in the same film layer, and the at least one first trace L1 is usually located in a different film layer from the second polar plate C2. In this way, the at least one first trace L1 and the sensing reading signal line L2 can be located in different film layers, thereby reducing the influence of the voltage jump corresponding to the at least one first trace L1 on the sensing reading signal line L2, and improving the reliability of signal transmission in the sensing reading signal line L2.

Or, in other embodiments, as shown in FIG. 9 and FIG. 10, the array substrate further includes a shielding layer 40, the shielding layer 40 is located on one side of the first active layer 31 facing the substrate 10, and the sensing reading signal line L2 is located in the shielding layer 40.

In the conventional LTPS technology, the shielding layer 40 may not be provided inside the array substrate. In the embodiments of the present application, by disposing a shielding layer 40 in the array substrate and the sensing reading signal line L2 in the shielding layer 40, the at least one first trace L1 and the sensing reading signal line L2 are located in different film layers, thereby reducing the influence of the voltage jump corresponding to the at least one first trace L1 on the sensing reading signal line L2, and improving the reliability of signal transmission in the sensing reading signal line L2.

In some embodiments, the shielding layer 40 includes a shielding trace 41, and an orthographic projection of the shielding trace 41 on the substrate 10 covers an orthographic projection of the channel region G of the second active structure Y2 on the substrate 10.

As can be seen from the foregoing, by disposing a shielding layer 40 in the array substrate and the sensing reading signal line L2 in the shielding layer 40, the at least one first trace L1 and the sensing reading signal line L2 are located in different film layers. On this basis, in the embodiments of the present application, a shielding trace 41 is also provided in the shielding layer 40, and the orthographic projection of the shielding trace 41 on the substrate 10 overlaps the orthographic projection of the channel region G of the second active structure Y2 on the substrate 10, which are conducive to improving the performance strength of the driving transistor QT and improving the usage reliability of the subsequent display panel.

In the embodiments of the present application, there is no limitation on whether the shielding trace 41 transmits a specific signal. Optionally, regardless of whether the shielding trace 41 transmits a signal, the shielding trace 41 needs to be insulated from the light-emitting driving circuit D1 and the photoelectric sensing circuit D2, which can reduce the influence of the shielding trace 41 on the reliability of signal transmission inside the light-emitting driving circuit D1 and the photoelectric sensing circuit D2.

In some optional embodiments, the material of the shielding layer 40 includes titanium and aluminum. Further, the material of the shielding layer 40 includes a stacked titanium-aluminum-titanium.

In the related art, the material of the shielding layer 40 is metal molybdenum (chemical formula: Mo), and in the embodiments of the present application, the material of the shielding layer 40 is adjusted, which is conducive to reducing the resistance corresponding to the shielding layer 40, thereby reducing the voltage drop corresponding to the sensing reading signal line L2 in the shielding layer 40, and improving the signal line transmission reliability of the sensing reading signal line L2.

In some embodiments, the shielding trace 41 is configured with a first power supply voltage, that is, the shielding trace 41 can have a fixed potential inside.

In some embodiments, as shown in FIG. 1 and FIG. 10, the array substrate also includes a first gate layer 51, the light-emitting driving circuit D1 also includes at least one switching transistor KT, the driving transistor QT also includes a driving control end QK, the photoelectric sensing circuit D2 also includes a sensing control signal line, and the first transistor T1 also includes a first control end K1 coupled to the sensing control signal line. The at least one first trace L1 is a scanning signal line SL and/or a light-emitting control line (not shown in the figures), and the scanning signal line SL is coupled to a control end of the switching transistor KT or the light-emitting control line is coupled to the control end of the switching transistor KT. The at least one first trace L1, the driving control end QK and the first control end K1 are located in the first gate layer 51.

The scanning signal line SL is configured to provide a scanning signal, and the light-emitting control line is configured to provide a light-emitting control signal. The scanning signal line SL and the light-emitting control line can both be located in the first gate layer 51. Optionally, the scanning signal line SL and the light-emitting control line can include the same material and be formed together in the same preparation process.

The light-emitting driving circuit D1 includes both a switching transistor KT and a driving transistor QT. The number of switching transistors KT may be multiple, and different switching transistors KT can be connected to different types of signals. For example, the control ends of some switching transistors KT are coupled to the scanning signal lines SL, and the control ends of some switching transistors KT are coupled to the light-emitting control signal lines.

Furthermore, the scanning signal line SL, the light-emitting control line, the driving control end QK and the first control end K1 may all be located in the first gate layer 51, which easily leads to a dense distribution of the conductor structures inside the first gate layer 51. On this basis, if the sensing reading signal line L2 is arranged in the first gate layer 51, the reliability of the signal transmission in the sensing reading signal line L2 may be affected. Therefore, in the embodiments of the present application, the sensing reading signal line L2 is arranged in other film layer structures except the first gate layer 51, so as to improve the reliability of the signal transmission in the sensing reading signal line L2.

In some embodiments, as shown in FIG. 9 and FIG. 10, the array substrate also includes a first gate layer 51, the driving transistor QT also includes a driving control end QK, the photoelectric sensing circuit D2 also includes a sensing control signal line, and the first transistor T1 also includes a first control end K1 coupled to the sensing control signal line. The at least one first trace L1 is a data line DL and is located in the first metal layer 21. The sensing reading signal line L2, the driving control end QK and the first control end K1 are located in the first gate layer 51.

In the embodiments of the present application, the at least one first trace L1 is the data line DL. In order to reduce the influence of the voltage jump of the data line DL on the sensing reading signal line L2, the sensing reading signal line L2 can be located in the first gate layer 51 together with the driving control end QK and the first control end K1, so that the data line DL and the sensing reading signal line L2 are located in different film layers, thereby improving the signal line transmission reliability of the sensing reading signal line L2.

It should be noted that in the embodiments of the present application, the layout of the scanning signal line SL and the light-emitting control line EL in the first gate layer 51 can be adjusted, so that the sensing reading information line has a certain spacing relative to the scanning signal line SL and the light-emitting control line EL, thereby reducing the influence of the scanning signal line SL and the light-emitting control line EL on the sensing reading signal line L2.

Figure 12:
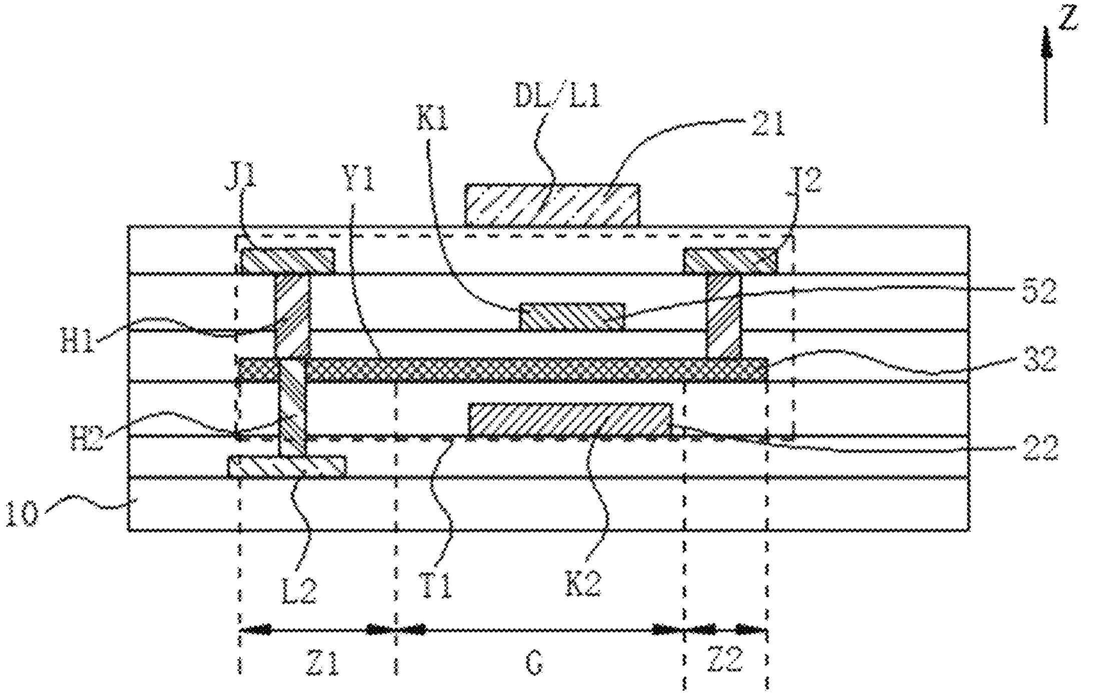
FIG. 12 is a schematic structural cross-sectional view of another array substrate provided in an embodiment of the present application.

In some embodiments, referring to FIG. 2 and FIG. 12, the photoelectric sensing circuit D2 also includes a first transistor T1, the first electrode J1 of the first transistor T1 is coupled to the sensing reading signal line L2, and the first transistor T1 includes a first active structure Y1, and the first doped region Z1 of the first active structure Y1 is coupled to the first electrode J1 of the first transistor T1. The photoelectric sensing circuit D2 further includes a first via H1 and a second via H2, the two ends of the first via H1 are coupled to the first electrode J1 of the first transistor T1 and the first doped region Z1 of the first active structure Y1 respectively, and the two ends of the second via H2 are coupled to the first doped region Z1 of the first active structure Y1 and the sensing reading signal line L2 respectively.

In the first active structure Y1, the first doped region Z1 is located on one side of the channel region G, and the first doped region Z1 may be coupled to the first electrode J1 of the first transistor T1 by means of a via. Specifically, a first via H1 is provided in the photoelectric sensing circuit D2, and an orthographic projection of the first via H1 on the substrate 10 overlaps orthographic projections of the first electrode J1 in the first transistor T1 and the first doped region Z1 in the first active structure Y1 on the substrate 10, so that the two ends of the first via H1 are coupled to the first electrode J1 of the first transistor T1 and the first doped region Z1 of the first active structure Y1 respectively.

In addition, a second via H2 is provided in the photoelectric sensing circuit D2, and an orthographic projection of the second via H2 on the substrate 10 overlaps orthographic projections of the first doped region Z1 of the first active layer 31 and the sensing reading signal line L2 on the substrate 10, so that the two ends of the second via H2 are coupled to the first doped region Z1 of the first active structure Y1 and the sensing reading signal line L2 respectively. Further, the first via H1 is located on one side of the second via H2 facing away from the substrate 10.

A positional relationship between the first via H1 and the second via H2 is not limited in the embodiments of the present application. Optionally, the orthographic projection of the first via H1 on the substrate 10 overlaps the orthographic projection of the second via H2 on the substrate 10. Further, optionally, the orthographic projection of the second via H2 on the substrate 10 is located within the orthographic projection of the first via H1 on the substrate 10, so that the second via H2 and the first via H1 can be prepared and formed separately in adjacent etching processes.

Figure 4:
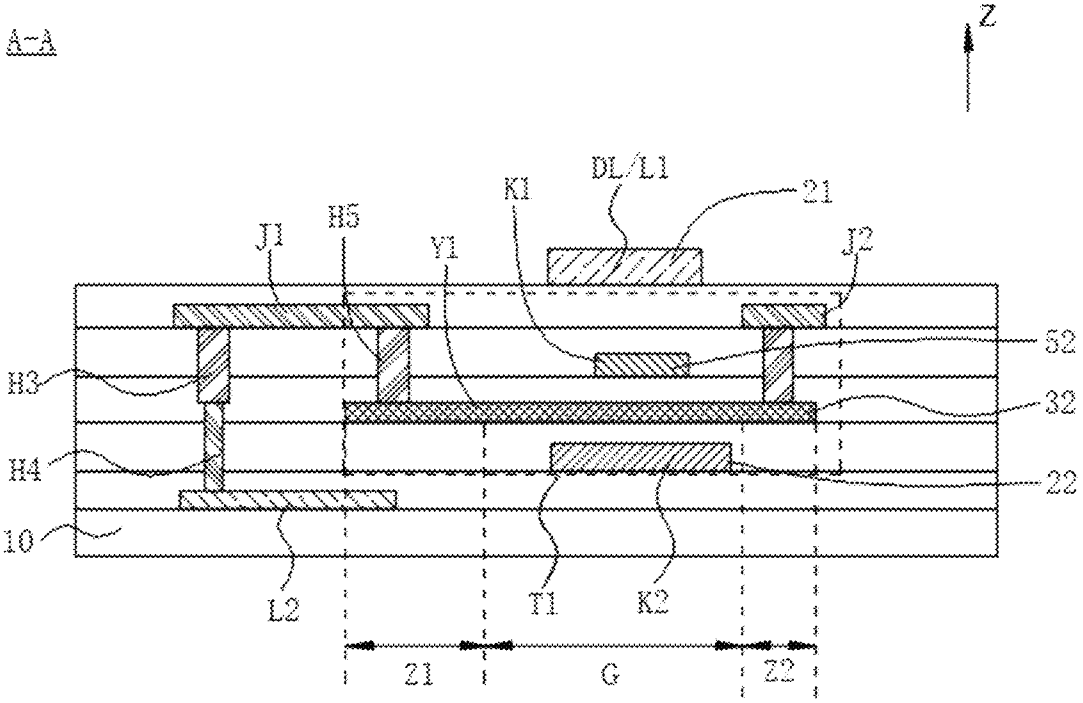
FIG. 4 is a schematic structural cross-sectional view at A-A in FIG. 3.
Figure 5:
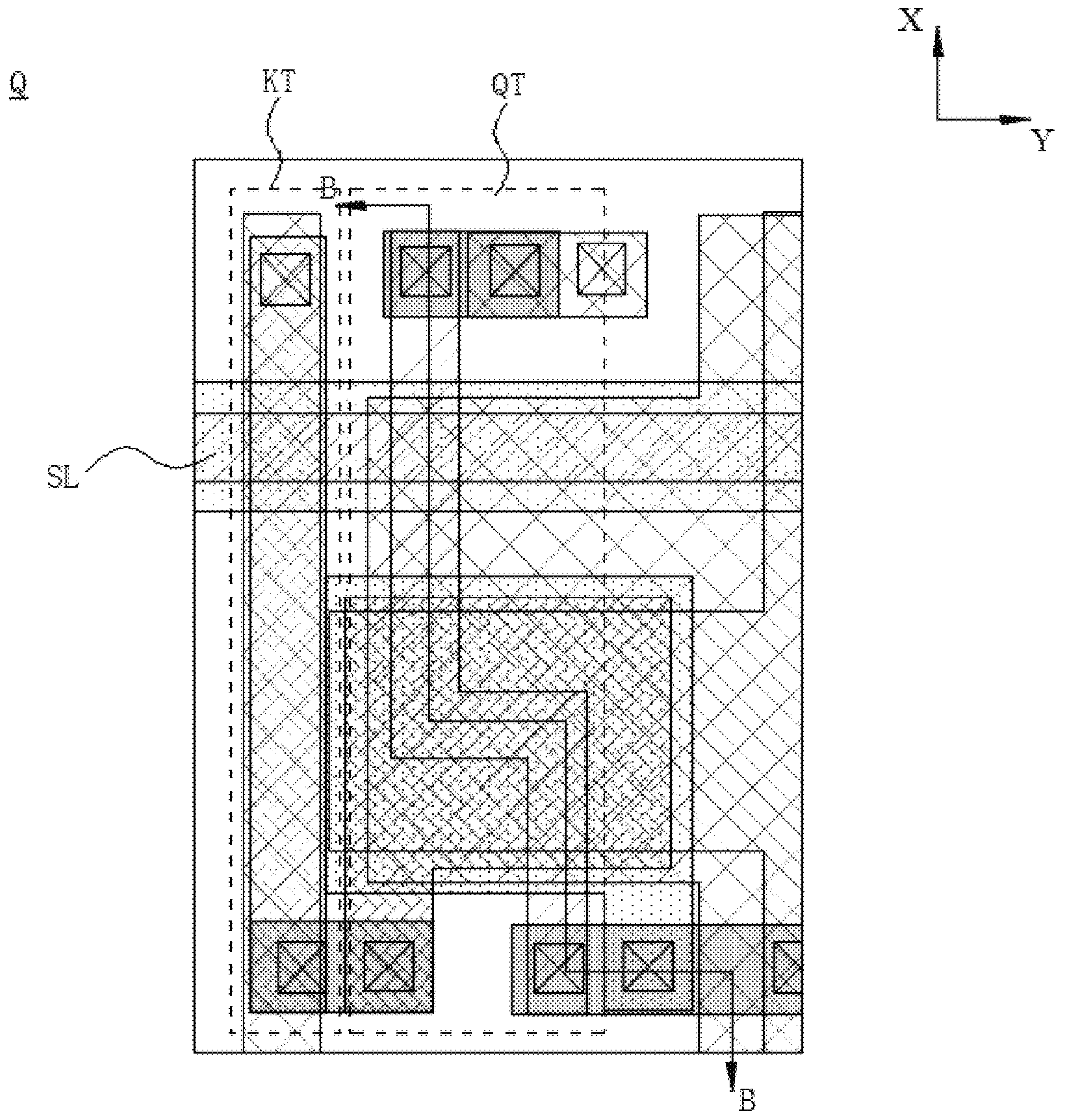
FIG. 5 is an enlarged structural schematic diagram at the region Q in FIG. 3.
Figure 6:
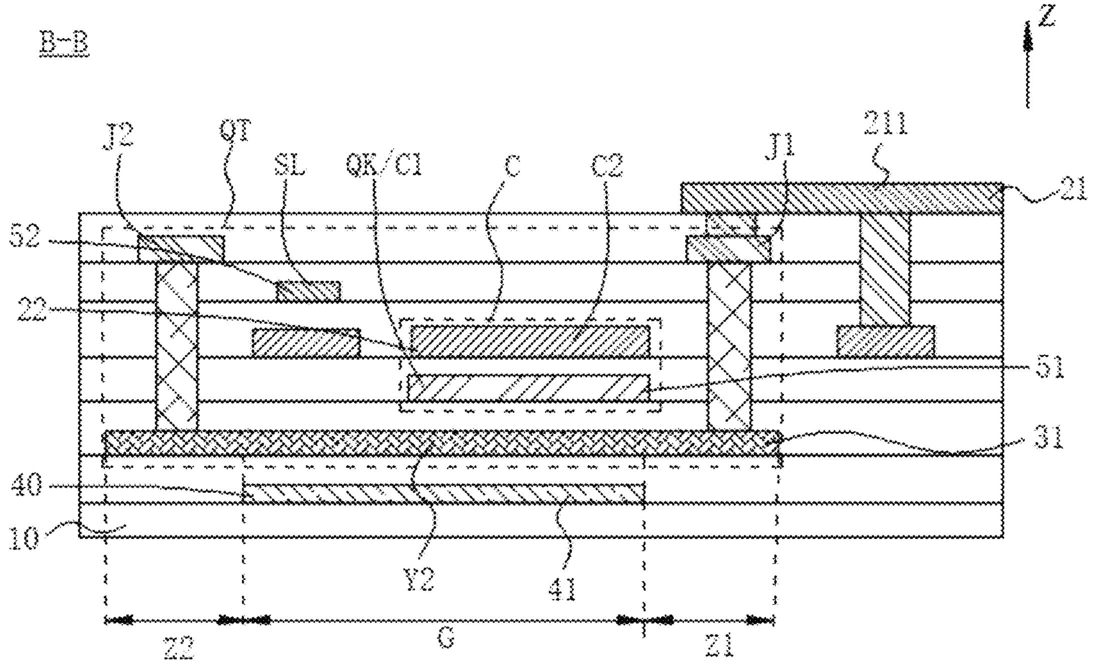
FIG. 6 is a schematic structural cross-sectional view at B-B in FIG. 5.

Or, in some other embodiments, as shown in FIG. 2 and FIG. 4, the photoelectric sensing circuit D2 further includes a third via H3, a fourth via H4 and a fifth via H5, the two ends of the third via H3 are coupled to the first electrode J1 of the first transistor T1 and the fourth via H4 respectively, the two ends of the fourth via H4 are coupled to the third via H3 and the sensing reading signal line L2 respectively, and the two ends of the fifth via H5 are coupled to the first electrode J1 of the first transistor T1 and the first doped region Z1 of the first active structure Y1 respectively.

The fifth via H5 is configured to achieve coupling between the first electrode J1 of the first transistor T1 and the first doped region Z1 of the first active structure Y1. Optionally, an orthographic projection of the fifth via H5 on the substrate 10 overlaps orthographic projections of both the first electrode J1 in the first transistor T1 and the first doped region Z1 in the first active structure Y1 on the substrate 10.

The third via H3 and the fourth via H4 are connected to each other, and the third via H3 is located on one side of the fourth via H4 facing away from the substrate 10. The existence of the third via H3 and the fourth via H4 can realize the coupling connection between the first electrode J1 of the first transistor T1 and the sensing reading signal line L2.

A positional relationship between the third via H3 and the fourth via H4 is not limited in the embodiments of the present application. Optionally, the orthographic projection of the fourth via H4 on the substrate 10 is located within the orthographic projection of the third via H3 on the substrate 10, so that the third via H3 and the fourth via H4 can be prepared and formed in sequence in adjacent two of the etching processes. Further, the third via H3 is usually prepared at the same time with the fifth via H5, and the fourth via H4 can be formed after the third via H3 and the fifth via H5 are prepared. In other words, in the embodiments of the present application, there is no needs to add an additional etching process to form the third via H3 and the fourth via H4 before the fifth via H5 is formed, which is conducive to improving the preparation efficiency of the array substrate.

Figure 13:
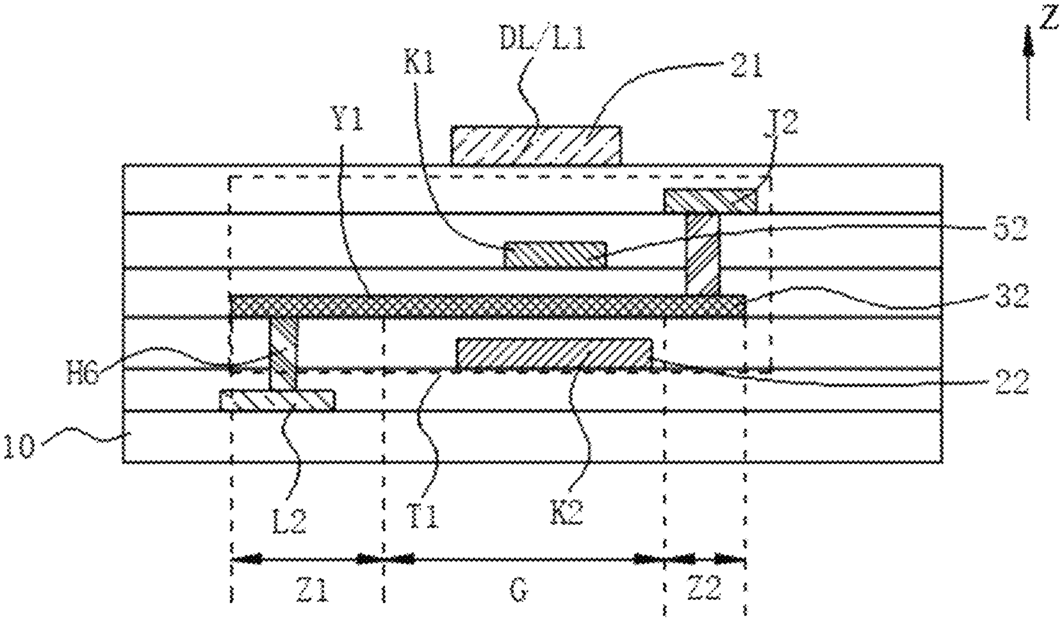
FIG. 13 is a schematic structural cross-sectional view of another array substrate provided in an embodiment of the present application.

Or, in some other embodiments, referring to FIG. 2 and FIG. 13, the photoelectric sensing circuit D2 further includes a sixth via H6, and the two ends of the sixth via H6 are coupled to the doped region of the first active structure Y1 and the sensing reading signal line L2 respectively.

In the embodiments of the present application, the first electrode J1 in the first transistor T1 can be removed, and the direct coupling connection between the doped region of the first active structure Y1 and the sensing reading signal line L2 can be realized by means of the sixth via H6, which is conducive to reducing the conductor density corresponding to the film layer where the first electrode J1 in the first transistor T1 is located, and reducing the difficulty of internal layout of the array substrate.

In some embodiments, as shown in FIG. 12, the orthographic projection of the first electrode J1 of the first transistor T1 on the substrate 10 and the orthographic projection of the sensing reading signal line L2 on the substrate 10 have an overlapping part, and the orthographic projection of the first electrode J1 of the first transistor T1 on the substrate 10 and the orthographic projection of the first doped region Z1 of the first active structure Y1 on the substrate 10 have an overlapping part. The orthographic projection of the sensing reading signal line L2 on the substrate 10 and the orthographic projection of the first doped region Z1 of the first active structure Y1 on the substrate 10 have an overlapping part.

In the embodiments of the present application, in order to reduce the voltage drop problem corresponding to the sensing reading signal line L2, the width corresponding to the sensing reading information line can be selectively widened, so that the orthographic projection of the sensing reading signal line L2 on the substrate 10 and the orthographic projection of the first doped region Z1 of the first active structure Y1 on the substrate 10 have an overlapping part.

On this basis, in the embodiments of the present application, the mutual coupling between the three can be achieved by disposing the first via H1 and the second via H2 to meet the transmission needs of the internal signal of the sensing reading signal line L2. Optionally, the orthographic projection of the first electrode J1 of the first transistor T1 on the substrate 10, the orthographic projection of the first doped region Z1 of the first active structure Y1 on the substrate 10, and the orthographic projection of the sensing reading signal line L2 on the substrate 10 have an overlapping part.

Or, in some other embodiments, as shown in FIG. 4, the orthographic projection of the sensing reading signal line L2 on the substrate 10 is at least partially located outside the orthographic projection of the first doped region Z1 of the first active structure Y1 on the substrate 10. On this basis, in order to realize the mutual coupling between the sensing reading signal line L2, the first doped region Z1 of the first active structure Y1 and the first electrode J1 of the first transistor T1, the third via H3, the fourth via H4 and the fifth via H5 need to be provided at the same time. The third via H3 and the fourth via H4 can realize the coupling between the first electrode J1 of the first transistor T1 and the sensing reading signal line L2, and the fifth via H5 can realize the coupling between the first doped region Z1 of the first active structure Y1 and the first electrode J1 of the first transistor T1.

In some embodiments, as shown in FIG. 2 and FIG. 3, the photoelectric sensing circuit D2 further includes a second transistor T2, the control end of the second transistor T2 is configured to receive and store photoelectric charges corresponding to the light signal, the first electrode J1 of the second transistor T2 is coupled to the first driving signal line L3, and the first transistor T1 is configured to be driven by the first fixed voltage on the first driving signal line L3 to output a photo-generated electrical signal corresponding to the photoelectric charges. The first power line 211 extends along a first direction X, the first driving signal line L3 extends along a second direction Y, and the first direction X intersects with the second direction Y.

The photoelectric sensing circuit D2 includes at least a first transistor T1 and a second transistor T2, and optionally, the second electrode J2 of the first transistor T1 can be coupled to the second electrode J2 of the second transistor T2. The control end of the second transistor T2 is configured to receive and store photoelectric charges corresponding to the light signal. Exemplarily, the photoelectric sensing circuit D2 also includes a photosensitive device, the photosensitive device is configured to receive the light signal and output the corresponding photoelectric charges according to the light signal, and the control end of the second transistor T2 is coupled to the output end of the photosensitive device.

The first electrode J1 of the second transistor T2 is coupled to the first driving signal line L3, and the first driving signal line L3 is configured to transmit the first fixed potential, that is, the voltage in the first driving signal line L3 may not change. Further, the first transistor T1 is configured to be driven by the first fixed voltage on the first driving signal line L3 to output a photo-generated electrical signal corresponding to the photoelectric charges, and transmit the photo-generated electrical signal to the second electrode J2 of the first transistor T1. On this basis, the first control end K1 of the first transistor T1 controls the first electrode J1 and the second electrode J2 of the first transistor T1 to be turned on, so that the photo-generated electrical signal can be transmitted to the sensing reading signal line L2.

Further, the first power line 211 extends along the first direction X, and the first driving signal line L3 extends along the second direction Y, the first direction X and the second direction Y being two intersecting directions. Optionally, the first direction X is perpendicular to the second direction Y Taking the final formed display panel being in a rectangular parallelepiped structure as an example, the first power line 211 extends along the first direction X, and the first direction X may be a long side direction corresponding to the display panel formed subsequently. The first driving signal line L3 extends along the second direction Y, and the second direction Y may be a short side direction corresponding to the display panel formed subsequently.

In the embodiments of the present application, by adjusting the layout of the photoelectric sensing circuit D2, an extension direction of the first driving signal line L3 is different from an extension direction of the first power line 211, so that the internal space of the array substrate can be used more flexibly to realize the integration of the photoelectric sensing circuit D2 and the light-emitting driving circuit D1 in the array substrate.

It should be noted that the photoelectric sensing circuit D2 can include the third transistor T3 in addition to the first transistor T1 and the second transistor T2. The specific circuit structure of the photoelectric sensing circuit D2 is not limited in the embodiments of the present application.

Figure 14:
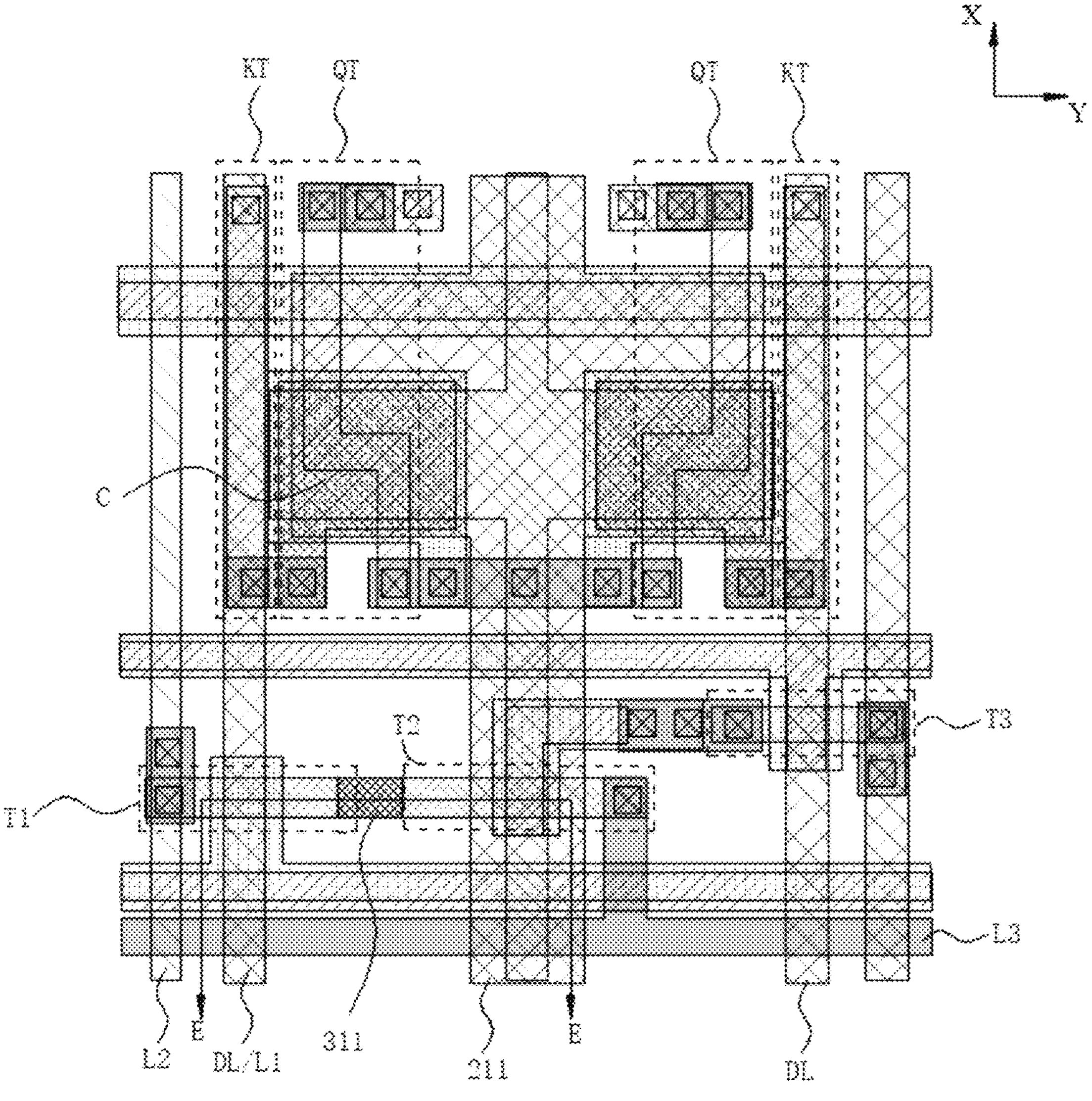
FIG. 14 is a schematic structural diagram of a local layout in another array substrate provided in an embodiment of the present application.
Figure 15:
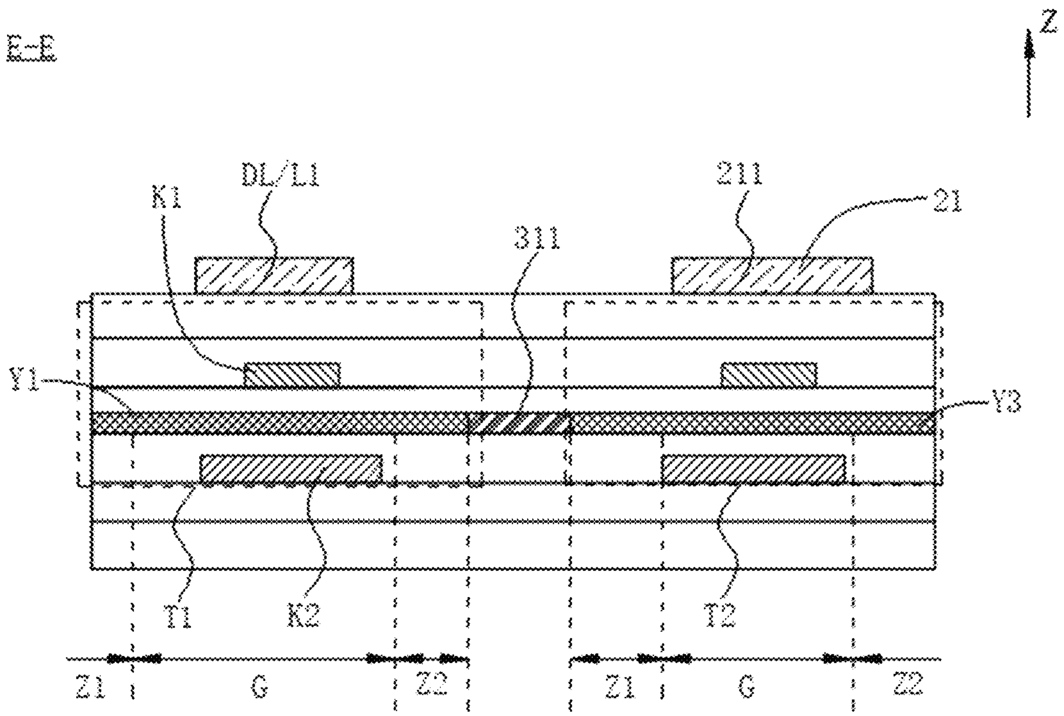
FIG. 15 is a schematic structural cross-sectional view at E-E in FIG. 14.

In some embodiments, referring to FIG. 14 and FIG. 15, the array substrate includes a first active layer 31, the photoelectric sensing circuit D2 also includes a first transistor T1, the first transistor T1 includes a first active structure Y1 located in the first active layer 31, the first doped region Z1 of the first active structure Y1 is coupled to the sensing reading signal line L2, and the second transistor T2 includes a third active structure Y3 located in the first active layer 31, and the first doped region Z1 of the third active structure Y3 is coupled to the first driving signal line L3. The first active layer 31 also includes a conductor portion 311, and the conductor portion 311 is coupled to the second doped region Z2 of the first active structure Y1 and the second doped region Z2 of the third active structure Y3.

The first active structure Y1 in the first transistor T1 and the third active structure Y3 in the second transistor T2 are arranged in the same layer and are both located in the first active layer 31. Optionally, the first active structure Y1 and the third active structure Y3 may include the same material and be formed together in the same preparation process.

As can be seen from the foregoing, the second electrode J2 in the first transistor T1 and the second electrode J2 in the second transistor T2 can be coupled to each other. In the embodiments of the present application, the second electrode J2 in the first transistor T1 and the second electrode J2 in the second transistor T2 can be eliminated at the same time, and the second doped region Z2 of the first active structure Y1 and the second doped region Z2 of the third active structure Y3 can be directly coupled by means of the conductor portion 311 of the same layer. In addition to eliminating the second electrode J2 in the first transistor T1 and the second electrode J2 in the second transistor T2, this design can also eliminate the via structure located between the second electrode J2 and the second doped region Z2, thereby reducing the number of vias inside the array substrate and reducing the reliability problem caused by too many vias. In addition, by requiring the second electrode J2 in the first transistor T1 and the second electrode J2 in the second transistor T2, it is conducive to reducing the conductor density in some conductor structures, thereby increasing the spacing distance between the conductors in the same layer and improving reliability.

The specific material composition of the conductor portion 311 is not limited in the embodiments of the present application. Optionally, the conductor portion 311, the first active structure Y1 and the third active structure Y3 are in an integrated structure. Specifically, the conductor portion 311 can be formed by performing a conductorization process on part of the structure in the first active layer 31, which is conducive to reducing the difficulty of preparing the conductor portion 311, the first active structure Y1 and the third active structure Y3, and improving the preparation efficiency.

In some embodiments, as shown in FIG. 3 and FIG. 4, the photoelectric sensing circuit D2 also includes a first transistor T1, the first electrode J1 of the first transistor T1 is coupled to the sensing reading signal line L2, and the first driving signal line L3 is arranged in the same layer as the first electrode J1 of the first transistor T1.

In the embodiments of the present application, by arranging the first driving signal line L3 and the first electrode J1 of the first transistor T1 in the same layer, the first driving transistor QT and the first electrode J1 can include the same material and be prepared and formed together in the same preparation process, thereby simplifying the processing process of the array substrate and improving the preparation efficiency. At the same time, the first electrode J1 of the first transistor T1 is usually located in a different film layer from the at least one first trace L1. Therefore, by disposing the first driving signal line L3 and the first electrode J1 of the first transistor T1 in the same layer, the first driving signal line L3 and the at least one first trace L1 can be located in different film layers, thereby meeting the extension requirements of the first driving signal line L3 and the at least one first trace L1.

In some embodiments, the photo-generated electrical signal line has a first current value, the photoelectric charges have a second current value, the first current value and the second current value have a predetermined ratio, and the first current value is greater than the second current value. In other words, the second transistor T2 can have the function of amplifying the signal.

Figure 16:
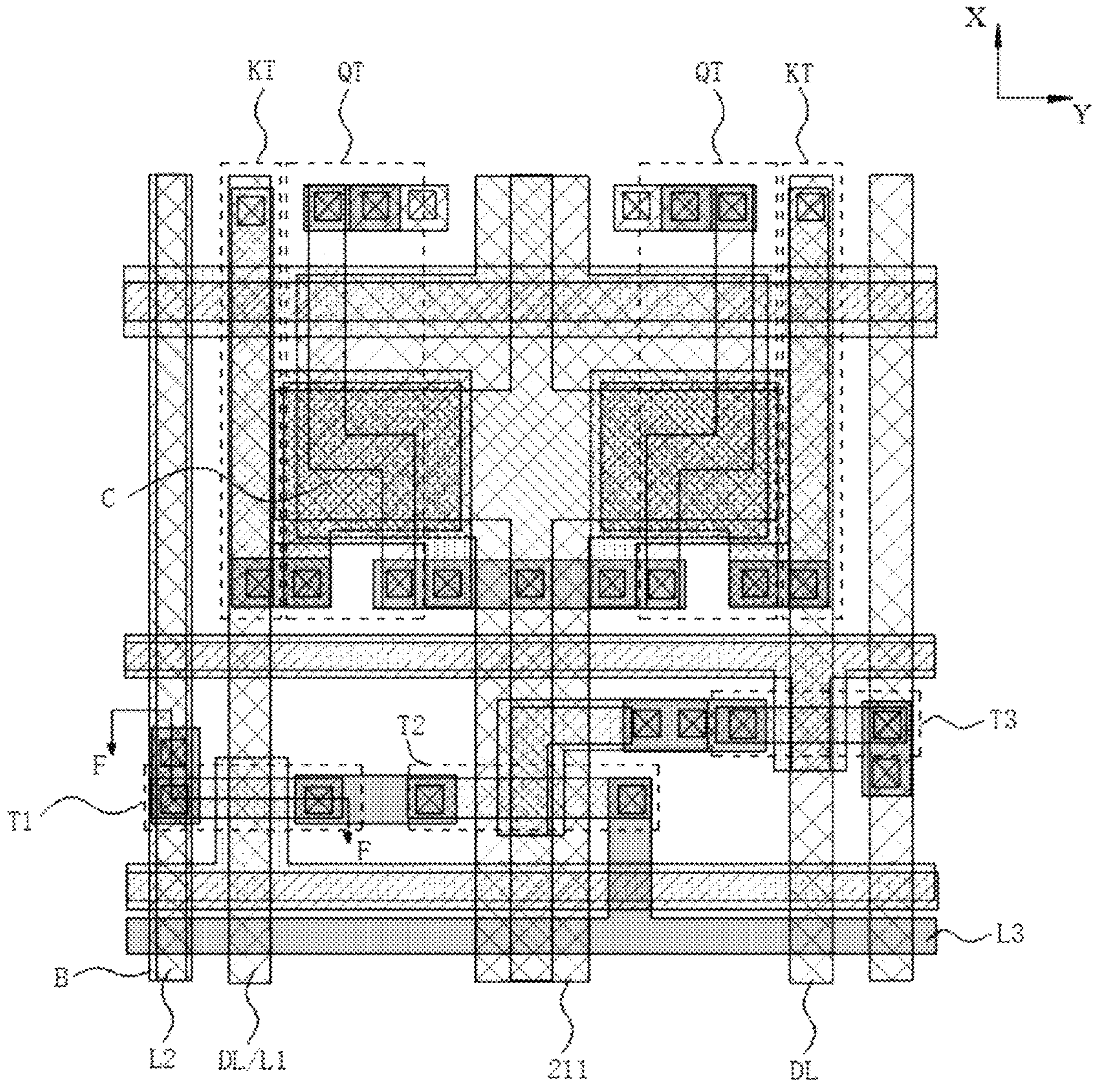
FIG. 16 is a schematic structural diagram of a local layout in another array substrate provided in an embodiment of the present application.
Figure 17:
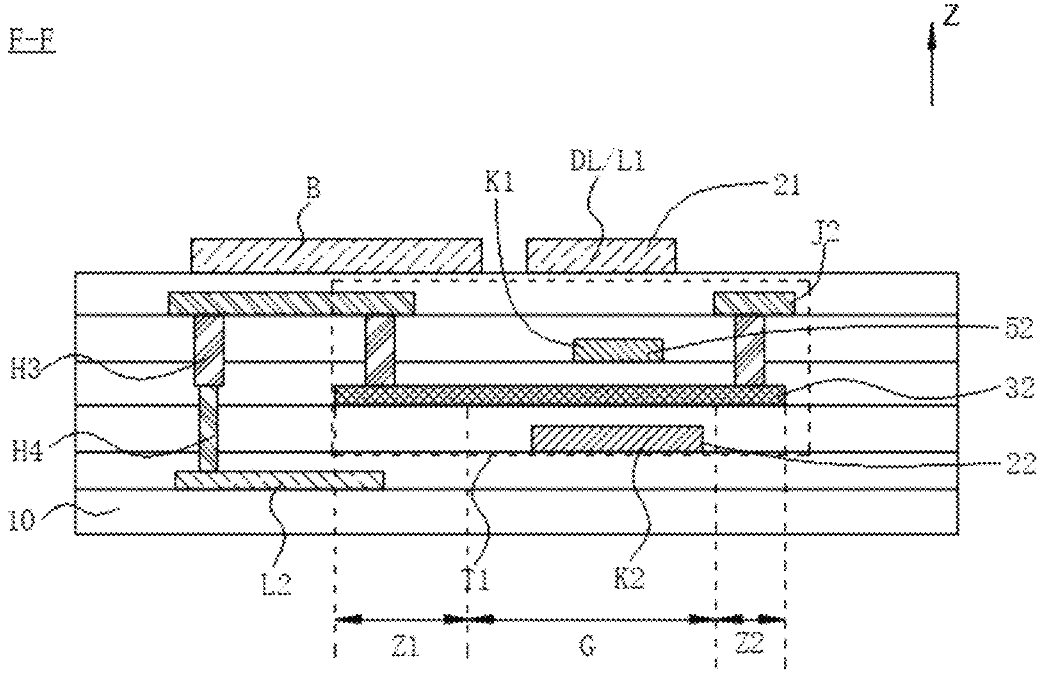
FIG. 17 is a schematic structural cross-sectional view at F-F in FIG. 16.

In some embodiments, referring to FIG. 16 and FIG. 17, the array substrate also includes a shielding structure B arranged in the same layer as the at least one first trace L1, the shielding structure B has a first orthographic projection on the substrate 10, and the sensing reading signal line L2 has a second orthographic projection on the substrate 10. The first orthographic projection and the second orthographic projection at least partially overlap; additionally or alternatively, the at least one first trace L1 has a third orthographic projection on the substrate 10, and at least part of the first orthographic projection is located between the second orthographic projection and the third orthographic projection.

As can be seen from the above-mentioned content, by disposing the at least one first trace L1 and the sensing reading signal line L2 in different layers, the influence of the at least one first trace L1 on the sensing reading signal line L2 can be reduced. However, due to the influence of factors such as the lateral electric field corresponding to the at least one first trace L1, although the at least one first trace L1 and the sensing reading signal line L2 are located in different layers, parasitic capacitance is still easily generated between the two, thereby affecting the operating reliability of the light-emitting driving circuit D1 and the photosensitive sensing circuit.

In view of this, in the embodiments of the present application, a shielding structure B is added, and the shielding structure B is arranged on the same layer as the at least one first trace L1. The shielding structure B mainly plays a role in hindering the partial electric field structure corresponding to the at least one first trace L1. Furthermore, the first orthographic projection corresponding to the shielding structure B can at least partially overlap the second orthographic projection; additionally or alternatively, the first orthographic projection can be located between the second orthographic projection and the third orthographic projection, so as to reduce the risk of parasitic capacitance generated between the at least one first trace L1 and the sensing reading signal line L2, and improve the operating reliability of the light-emitting driving circuit D1 and the photosensitive sensing circuit.

The type of signals inside the shielding structure B is not limited in the embodiments of the present application, as long as the interior of the shielding structure B can transmit a fixed potential. In some embodiments, the light-emitting driving circuit D1 also includes a driving transistor QT, the first electrode J1 of the driving transistor QT is coupled to the first power line 211, and the shielding structure B and the first power line 211 are configured with the same voltage value.

In the embodiments of the present application, the first power line 211 is configured to transmit a power signal, which is a signal of a fixed potential. On this basis, in the embodiments of the present application, the shielding structure B is set to transmit the same voltage value as the first power line 211, so that the shielding structure B can also transmit the signal of the fixed potential, thereby meeting the shielding needs of the shielding structure B.

A positional relationship between the shielding structure B and the first power line 211 is not limited in the embodiments of the present application. Optionally, the shielding structure B and the first power line 211 are arranged on the same layer, that is, the shielding structure B, the at least one first trace L1 and the first power line 211 can be located in the same film layer.

Figure 18:
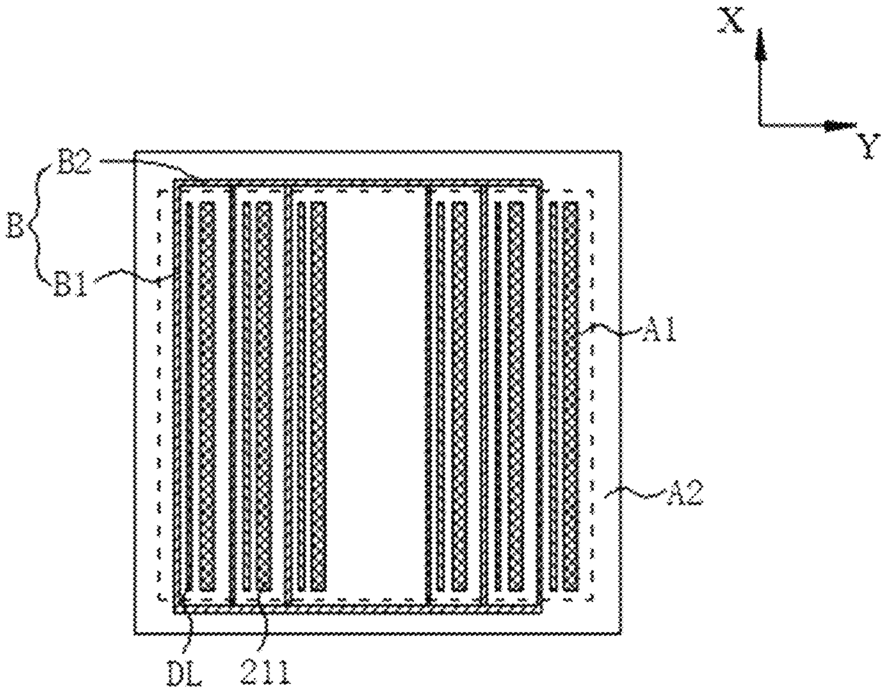
FIG. 18 is a schematic diagram of a relative position relationship between a shielding structure, a data line and a first power line in another array substrate provided in an embodiment of the present application.

In some embodiments, referring to FIG. 16 and FIG. 18, the array substrate has a first area A1 and a second area A2 arranged around a periphery side of the first area A1. The shielding structure B includes multiple first sub-portions B1 and at least one second sub-portion B2. The first sub-portions B1 are at least partially disposed in the first area A1. The first sub-portions B1 and the sensing reading signal line L2 extend in the first direction X. The multiple first sub-portions B1 are arranged at intervals in the second direction Y The first direction X intersects with the second direction Y The second sub-portion B2 is disposed in the second area A2. The second sub-portion B2 extends along the second direction Y and is connected with the multiple first sub-portions B1.

The array substrate has at least two areas including the first area A1 and the second area A2. The first area A1 corresponds to the display area in the display panel formed subsequently, and the second area A2 corresponds to the non-display area in the display panel formed subsequently. The size and shape of the first area A1 and the second area A2 are not limited in the embodiments of the present application. Optionally, the first area A1 may be in a square structure, and the second area A2 may be in a square ring structure.

The shielding structure B includes a plurality of first sub-portions B1 and at least one second sub-portion B2. The first sub-portion B1 and the sensing reading signal line L2 may extend in the same direction, and the plurality of first sub-portions B1 are arranged side by side in the second direction Y The first sub-portion B1 may be completely located in the first area A1, or the first sub-portion B1 may be partially located in the first area A1 and partially located in the second area A2.

The second sub-portion B2 is located in the second area A2 and is used to connect the plurality of first sub-portions B1. In other words, the second sub-portion B2 can connect the plurality of first sub-portions B1 into one, so that the same signal can be transmitted in each first sub-portion B1. The material composition of the first sub-portions B1 and the second sub-portion B2 is not limited in the embodiments of the present application. Optionally, the first sub-portions B1 and the second sub-portion B2 are located in the same film layer and include the same material, which is conducive to reducing the processing steps corresponding to the shielding structure B and improving the preparation efficiency.

In addition, the number of second sub-portions B2 is not limited in the embodiments of the present application. The number of second sub-portions B2 may be one, and the second sub-portion B2 is located at one end of the first sub-portion B1 in the first direction X, or the number of second sub-portions B2 may be two, and the two second sub-portions B2 are arranged at the two ends of the first sub-portion B1 in the first direction X respectively.

In the embodiments of the present application, the second sub-portion B2 can realize the interconnection between multiple first sub-portions B1, so that the same potential signal can be transmitted between different first sub-portions B1, thereby reducing the difficulty of signal transmission corresponding to the shielding structure B, which has strong practicality.

In the second aspect, the embodiment of the present application provides a display panel, including an array substrate in any of the aforementioned embodiments.

In addition to realizing the display function, the display panel in the embodiments of the present application can also realize light-sensing functions such as fingerprint recognition and face recognition, so as to improve the applicable scenarios of the display panel and enhance the user's experience.

It should be noted that the display panel provided in the embodiments of the present application has the beneficial effects of the array substrate in any of the aforementioned embodiments. Referring to the aforementioned description of the beneficial effects of the array substrate, and the embodiments of the present application may not be repeated.

Figure 19:
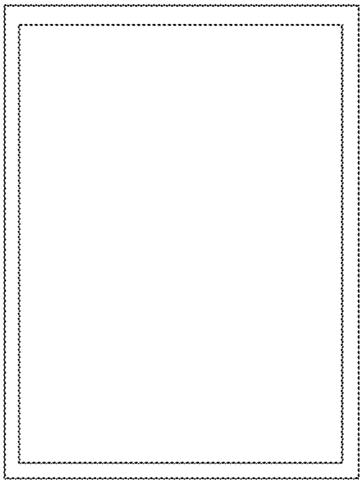
FIG. 19 is a schematic structural diagram of a display device provided in an embodiment of the present application.

In the third aspect, referring to FIG. 19, an embodiment of the present application provides a display device, comprising a display panel in any of the aforementioned embodiments.

It should be noted that the display device provided in the embodiments of the present application has the beneficial effects of the display panel in any of the aforementioned embodiments. For details, referring to the aforementioned description of the beneficial effects of the display panel and the array substrate, which are not be repeated in the embodiments of the present application.

Figure 20:
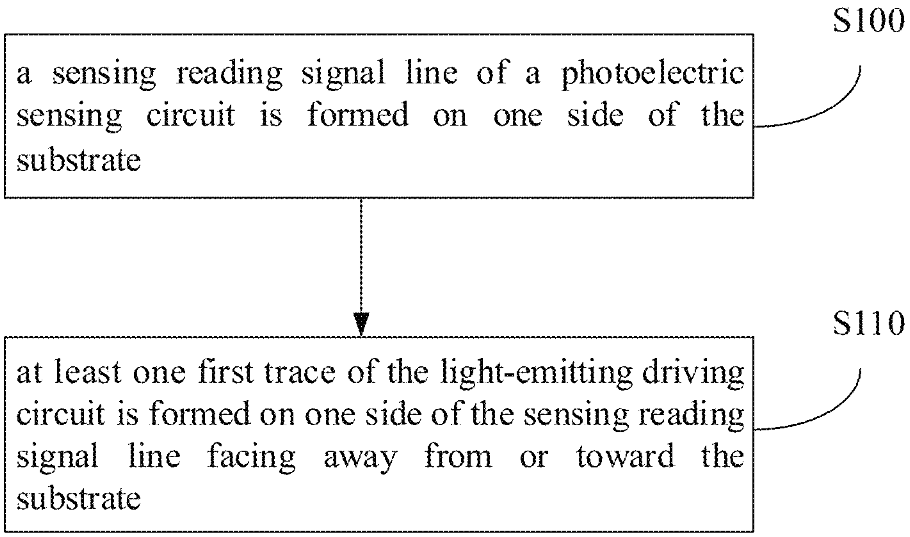
FIG. 20 is a flow chart of a method for preparing the array substrate provided in an embodiment of the present application.

In a fourth aspect, referring to FIG. 20 and FIG. 21, an embodiment of the present application provides a method for preparing an array substrate, which includes S100 and S110.

In S100: a sensing reading signal line of a photoelectric sensing circuit is formed on one side of the substrate.

Figure 21A:
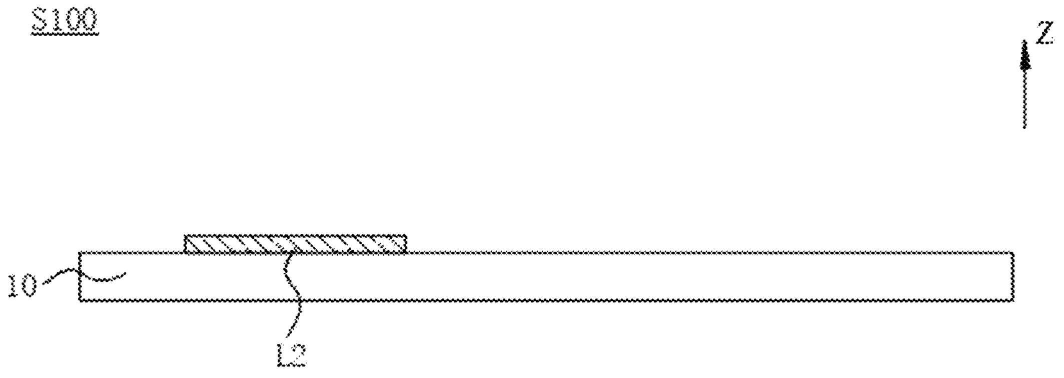
FIG. 21*a* to FIG. 21*b* are schematic process structural diagrams of a method for preparing the array substrate provided in an embodiment of the present application.

Referring to FIG. 21*a*, in step S100, the photoelectric sensing circuit D2 is configured to receive a light signal and generate a corresponding photo-generated electrical signal according to the light signal. The sensing reading signal line L2 is configured to transmit the photo-generated electrical signal. In the related art, the sensing reading signal line L2 in the photoelectric sensing circuit D2 may be arranged in the same layer as the at least one first trace L1 in the light-emitting driving circuit D1, that is, the photosensitive reading signal line may be located in the same film layer as the at least one first trace L1, which may cause the distance between the photosensitive reading signal line and the at least one first trace L1 to be too close, thereby causing the coupling capacitance between the photosensitive reading signal line and the at least one first trace L1 to be relatively large.

In S110: at least one first trace of the light-emitting driving circuit is formed on one side of the sensing reading signal line facing away from or toward the substrate.

Figure 21B:
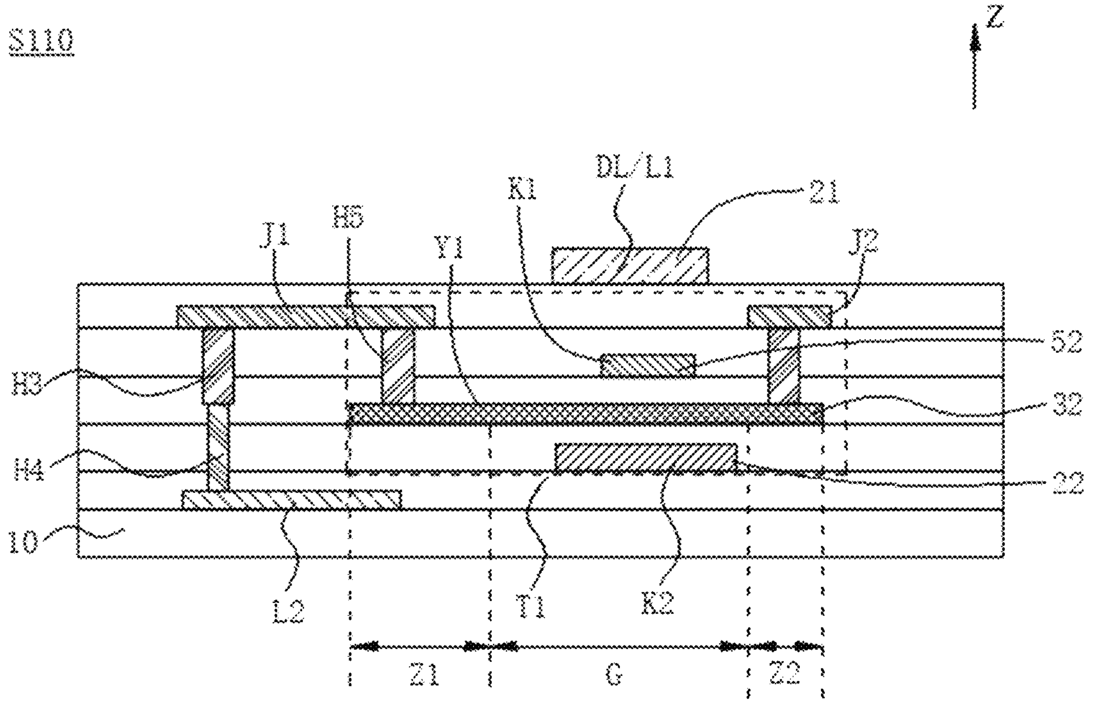

Referring to FIG. 21*b*, in step S110, the at least one first trace L1 is configured to receive a first signal having at least two different potentials. On this basis, if the distance between the at least one first trace L1 and the sensing reading signal line L2 is too close, then when a voltage jump occurs in the at least one first trace L1, the coupling capacitance between the at least one first trace L1 and the sensing reading signal line L2 may cause the voltage on the photosensitive reading signal line to change, thereby inducing noise and causing problems such as abnormal sensing of light signals.

In view of this, in the embodiments of the present application, the relative position relationship between the at least one first trace L1 and the sensing reading signal line L2 is changed, so that the at least one first trace L1 is located on one side of the sensing reading signal line L2 facing away from the substrate 10, that is, the at least one first trace L1 and the sensing reading signal line L2 are located in different film layers, so that the at least one first trace L1 and the sensing reading signal line L2 can have a certain interval in the thickness direction Z of the array substrate, so as to reduce the coupling capacitance between the at least one first trace L1 and the sensing reading signal line L2, thereby reducing the influence of the voltage jump corresponding to the at least one first trace L1 on the sensing reading signal line L2, improving the reliability of signal transmission in the sensing reading signal line L2, and improving the corresponding light-sensing accuracy of the display panel.

Figure 22:
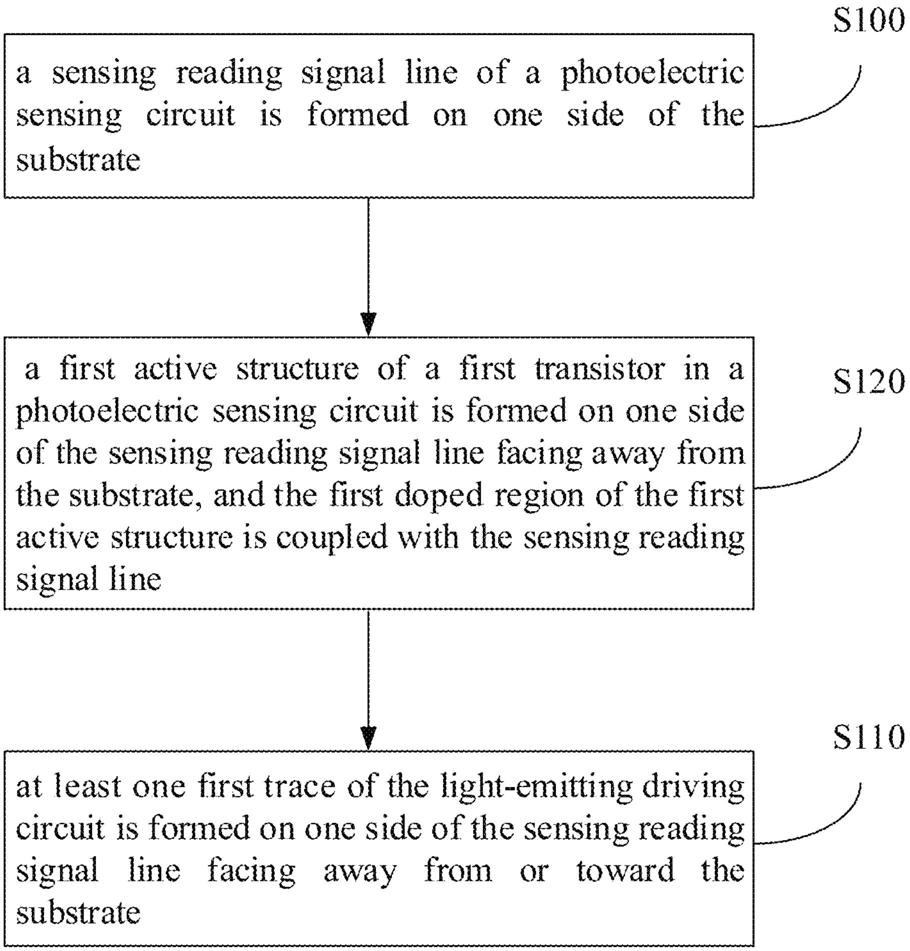
FIG. 22 is a flow chart of another method for preparing the array substrate provided in an embodiment of the present application.
Figure 23:
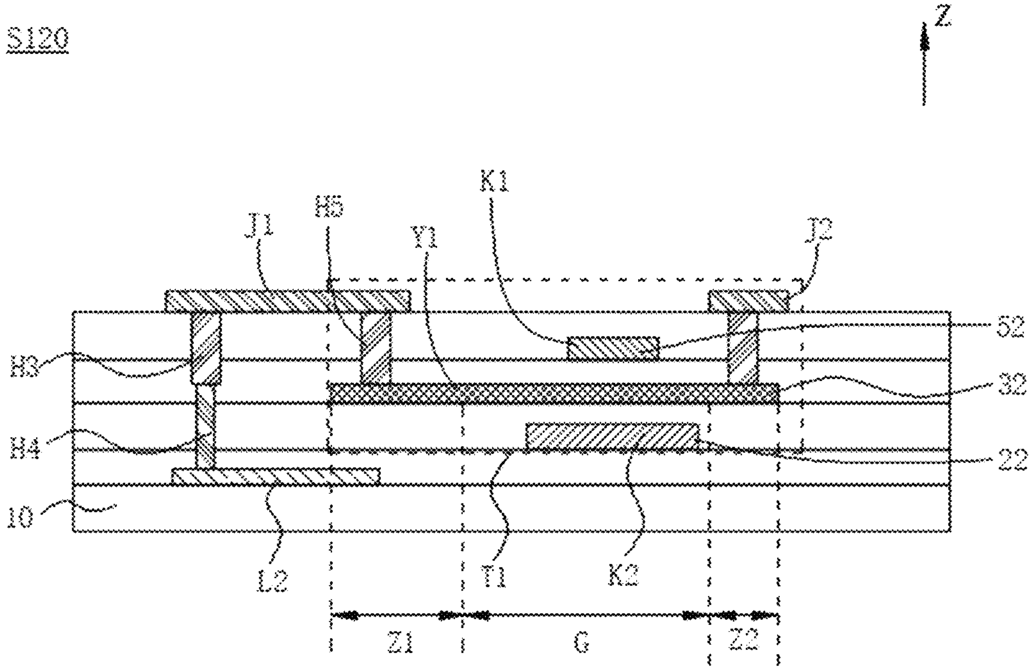
FIG. 23 is a schematic process structural diagram of another method for preparing the array substrate provided in an embodiment of the present application.

Referring to FIG. 22 and FIG. 23, in some embodiments, prior to step S110, the method also includes S120.

In S120: a first active structure of a first transistor in a photoelectric sensing circuit is formed on one side of the sensing reading signal line facing away from the substrate, and the first doped region of the first active structure is coupled with the sensing reading signal line.

Referring to FIG. 23, in step S120, the first active structure Y1 is formed after the sensing reading signal line L2, and the at least one first trace L1 is formed after the first active structure Y1 in a subsequent step, so that the at least one first trace L1 and the sensing reading signal line L2 can have a certain interval in the thickness direction Z of the array substrate, reducing the influence of the voltage jump corresponding to the at least one first trace L1 on the sensing reading signal line L2, thereby improving the reliability of signal transmission in the sensing reading signal line L2 and improving the corresponding light-sensing accuracy of the display panel.

Figure 24:
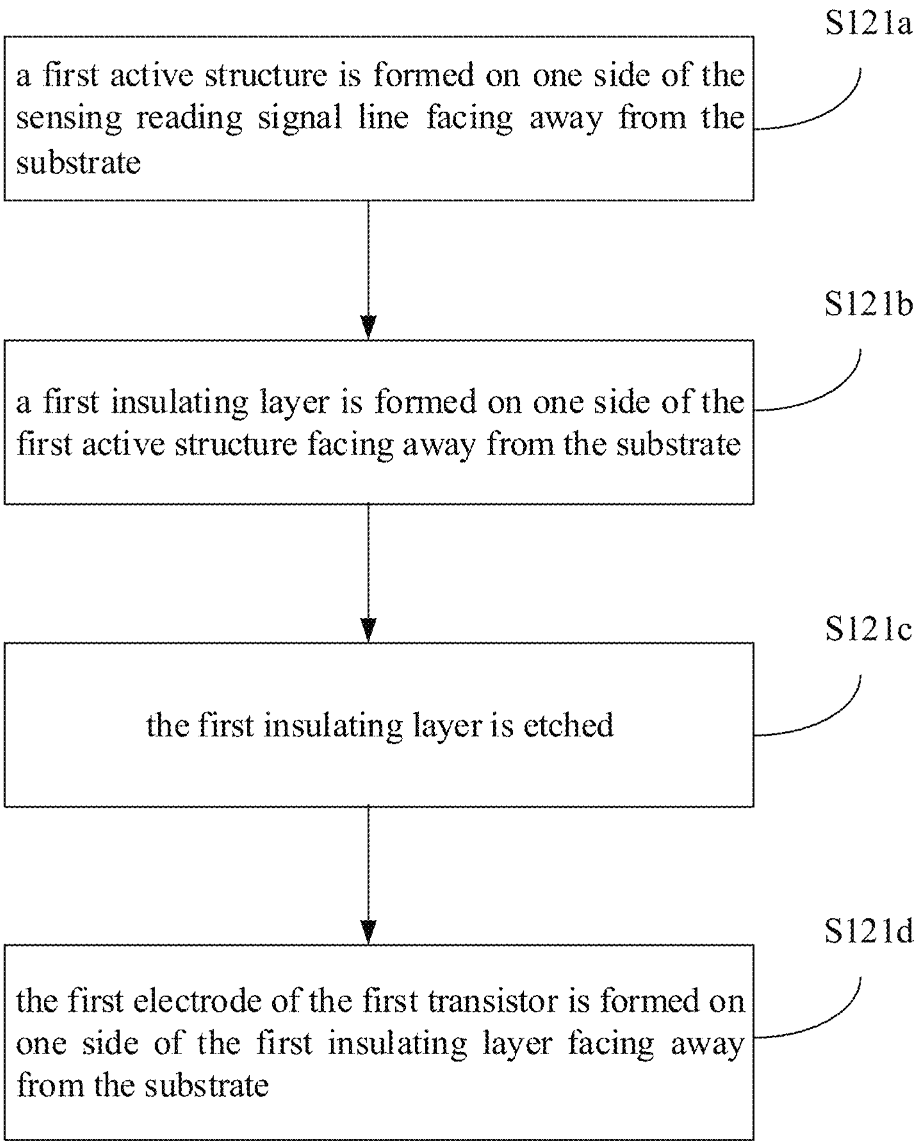
FIG. 24 is a flow chart of another method for preparing the array substrate provided in an embodiment of the present application.

Referring to FIG. 24 and FIG. 25, in some embodiments, step S120 includes S121*a*, S121*b*, S121*c* and S121*d*.

In S121*a*: a first active structure is formed on one side of the sensing reading signal line facing away from the substrate.

Figure 25A:
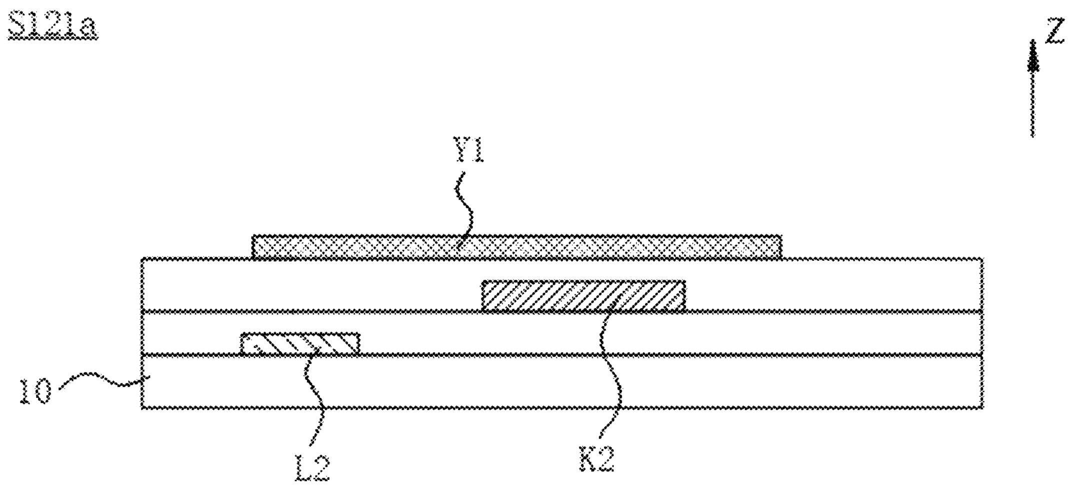
FIG. 25*a* to FIG. 25*d* are schematic process structural diagrams of another method for preparing the array substrate provided in an embodiment of the present application.
Figure 25B:
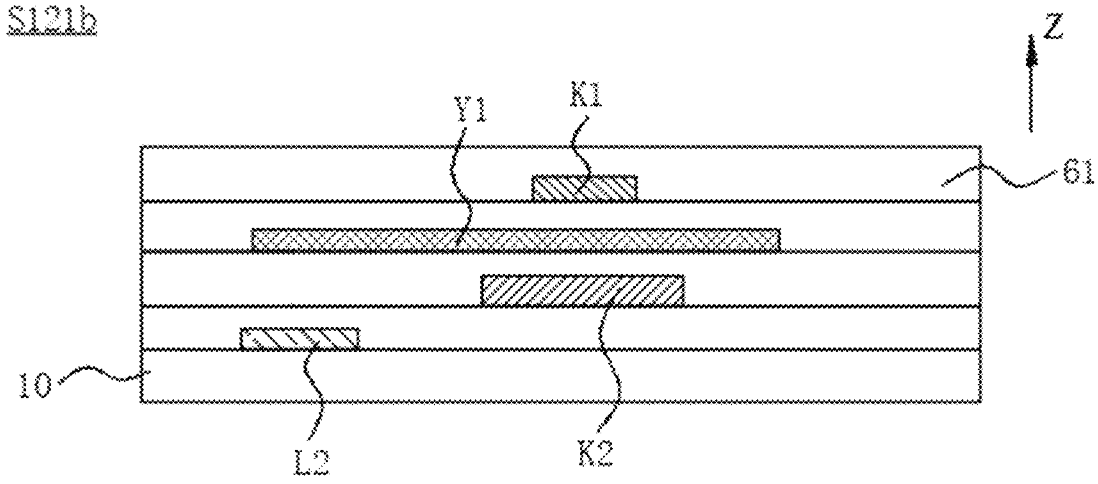

Referring to FIG. 25*a*, in step S121*a*, an orthographic projection of the first doped region Z1 in the first active structure Y1 on the substrate 10 overlaps an orthographic projection of the sensing reading signal line L2 on the substrate 10.

In S121*b*: a first insulating layer is formed on one side of the first active structure facing away from the substrate.

In step S121*b*, the first insulating layer 61 includes an insulating material, and the first insulating layer 61 can cover the first active structure Y1, so that the conductor or semiconductor structure to be formed subsequently is spaced apart from the first active structure Y1 in the thickness direction Z of the substrate 10.

In S121*c*: the first insulating layer is etched.

Figure 25C:
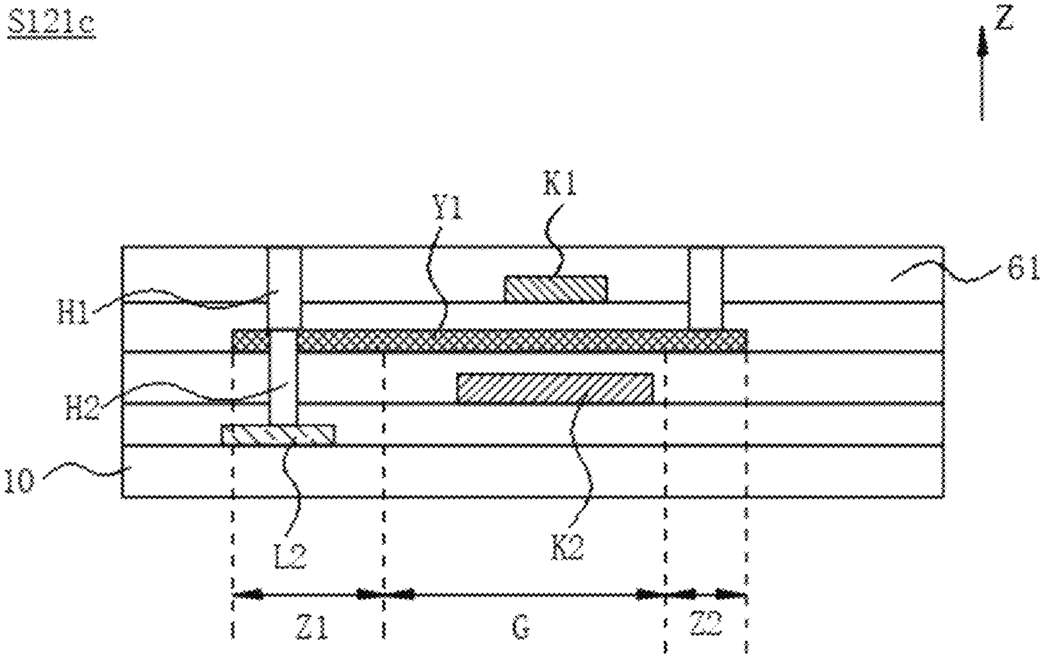

Referring to FIG. 25*c*, in step S121*c*, a first via H1 that penetrates through the first insulating layer 61 and is connected to the first doped region Z1 in the first active structure Y1, and a second via H2 that connects the first via H1 and the sensing reading signal line L2 can be formed by an etching process. The first via H1 is located on one side of the second via H2 facing away from the substrate 10. Optionally, an orthographic projection of the second via H2 on the substrate 10 is located within an orthographic projection of the first via H1 on the substrate 10.

In S121*d*: the first electrode of the first transistor is formed on one side of the first insulating layer facing away from the substrate.

Figure 25D:
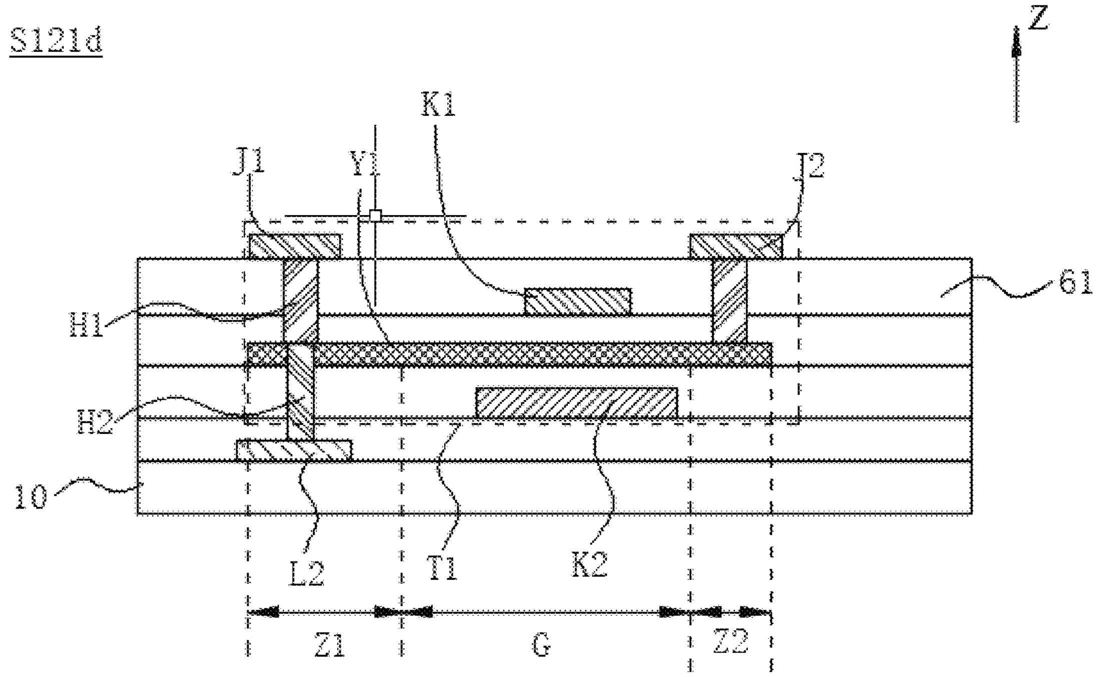

Referring to FIG. 25*d*, in step S121*d*, the first electrode J1 of the first transistor is coupled to the first doped region Z1 and the sensing reading signal line L2 through the first via H1 and the second via H2.

In the embodiments of the present application, the coupling between the first electrode J1 and the sensing reading signal line L2 is achieved by a hole digging and etching process after the first insulating layer 61 is prepared, and no additional via structures and corresponding etching processes are required before the first insulating layer 61, which is conducive to simplifying the difficulty of preparing the array substrate.

Figure 26:
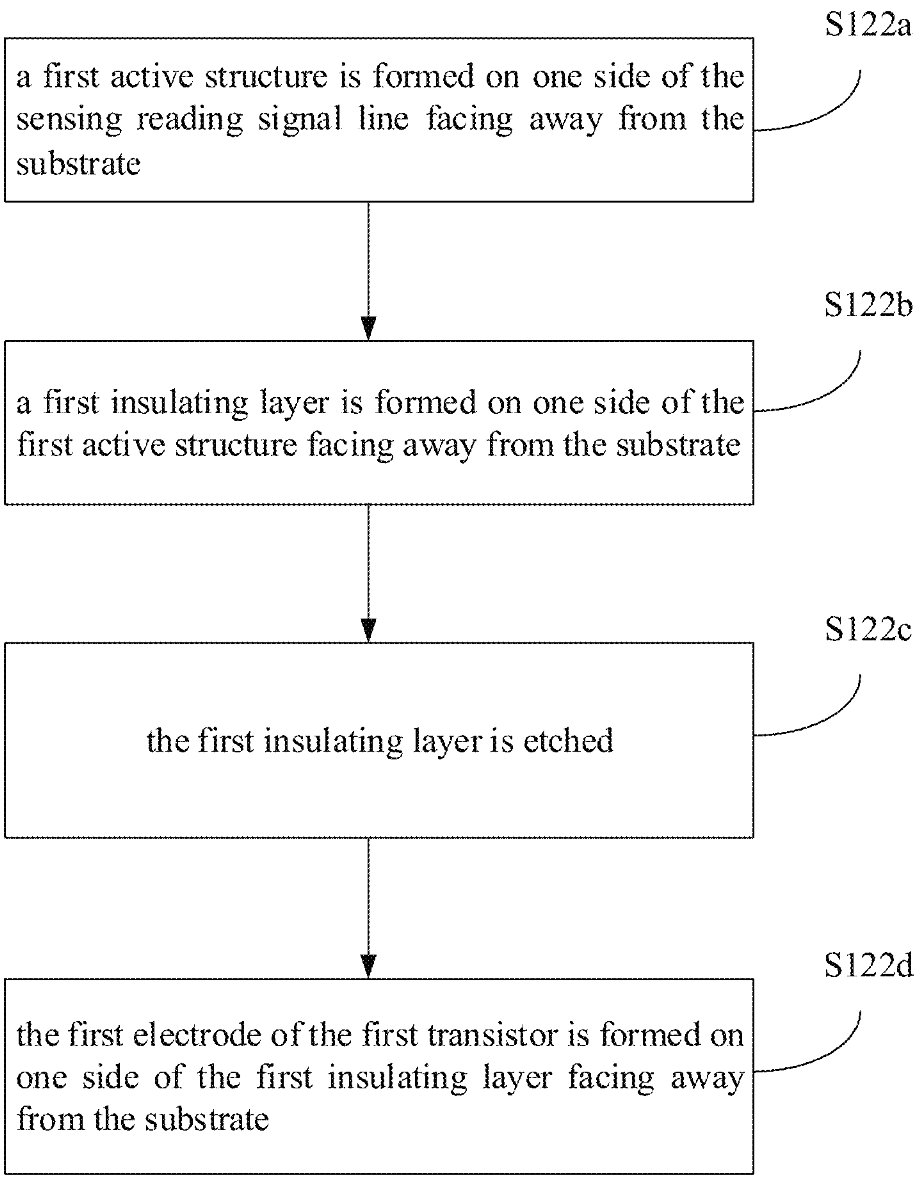
FIG. 26 is a flow chart of another method for preparing the array substrate provided in an embodiment of the present application.

Referring to FIG. 26 and FIG. 27, in some embodiments, step S120 includes: S122*a*, S122*b*, S122*c* and S122*d*.

In S122*a*: a first active structure is formed on one side of the sensing reading signal line facing away from the substrate.

Figure 27A:
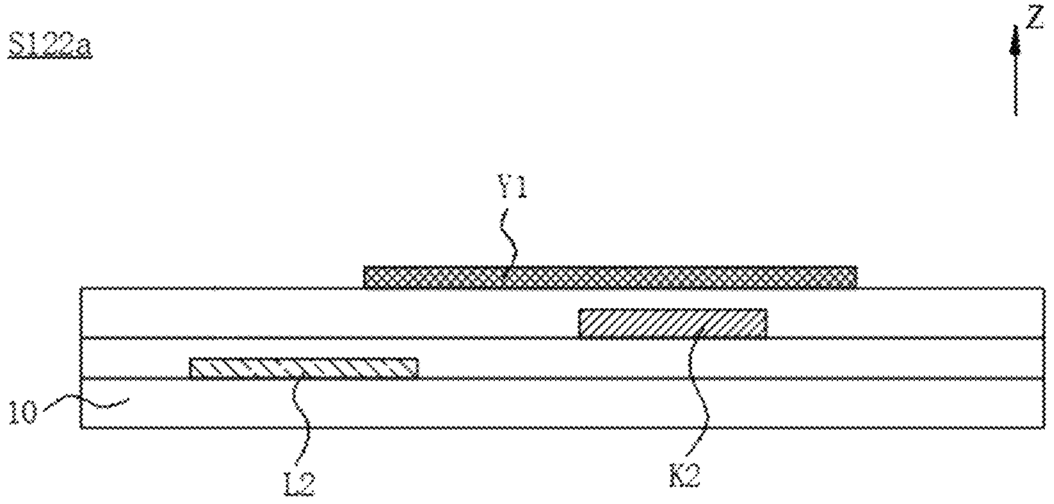
FIG. 27*a* to FIG. 27*d* are schematic process structural diagrams of another method for preparing the array substrate provided in an embodiment of the present application.

Referring to FIG. 27*a*, in step S122*a*, the orthographic projection of the sensing reading signal line L2 on the substrate 10 is at least partially located outside the orthographic projection of the first active structure Y1 on the substrate 10.

In S122*b*: a first insulating layer is formed on one side of the first active structure facing away from the substrate.

Figure 27B:
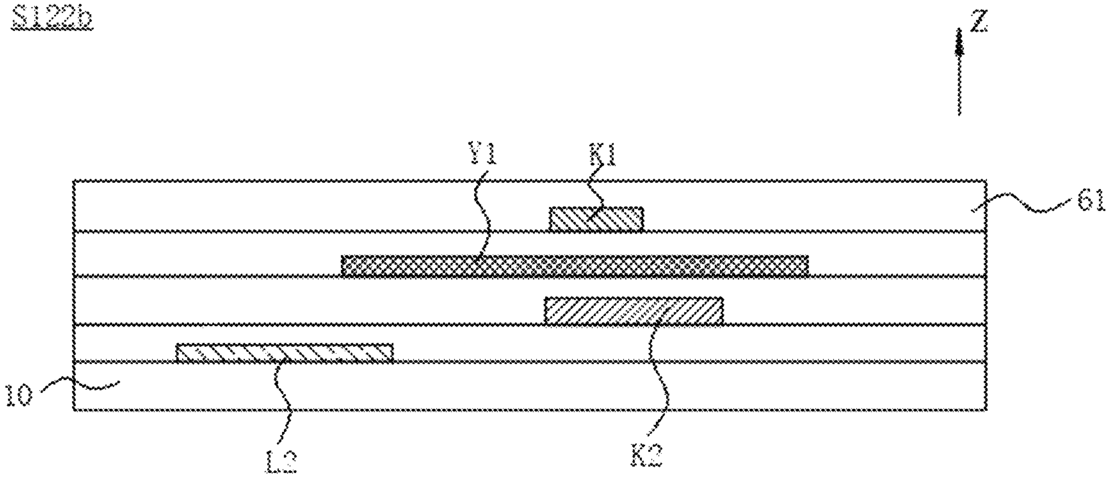

Referring to FIG. 27*b*, in step S122*b*, the first insulating layer 61 includes an insulating material, and the first insulating layer 61 can cover the first active structure Y1, so that the conductor or semiconductor structure to be formed subsequently is spaced apart from the first active structure Y1 in the thickness direction Z of the substrate 10.

In S122*c*: the first insulating layer is etched.

Figure 27C:
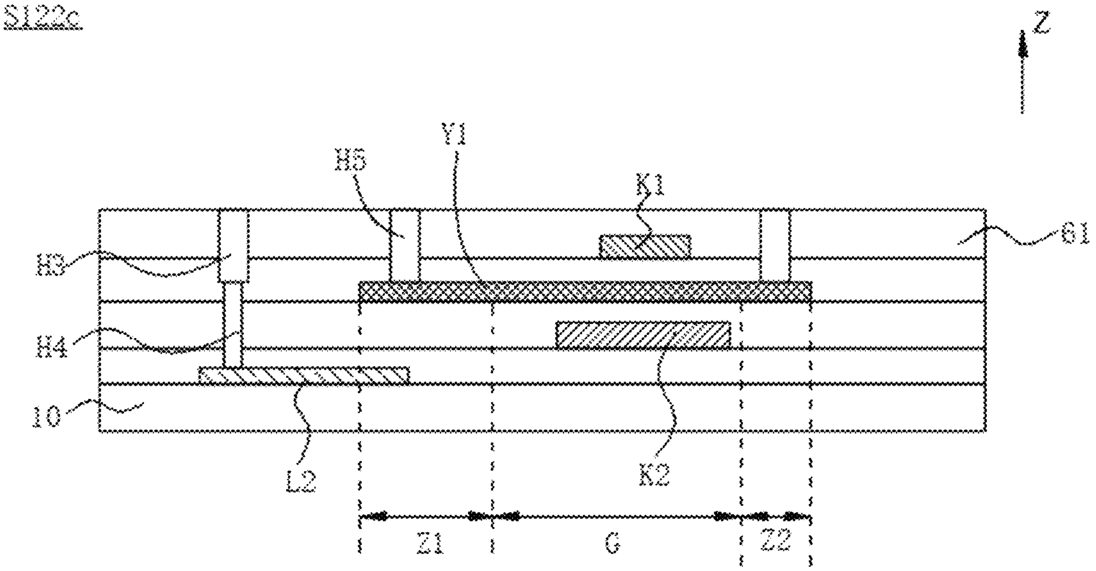

Referring to FIG. 27*c*, in step S122*c*, a third via H3 penetrating through the first insulating layer 61, a fifth via H5 penetrating through the first insulating layer 61 and being connected to the first doped region Z1 of the first active structure Y1, and a fourth via H4 connecting the third via H3 and the sensing reading signal line L2 can be formed by an etching process. The orthographic projection of the third via H3 on the substrate 10 is located outside the orthographic projection of the first active structure Y1 on the substrate 10. Further optionally, during the formation of the third via H3, a fifth via H5 can be formed simultaneously, and the fifth via H5 is connected to the first doped region Z1 of the first active structure Y1, that is, the orthographic projection of the fifth via H5 on the substrate 10 overlaps the orthographic projection of the first doped region Z1 in the first active structure Y1 on the substrate 10.

In S122*d*: the first electrode of the first transistor is formed on one side of the first insulating layer facing away from the substrate.

Figure 27D:
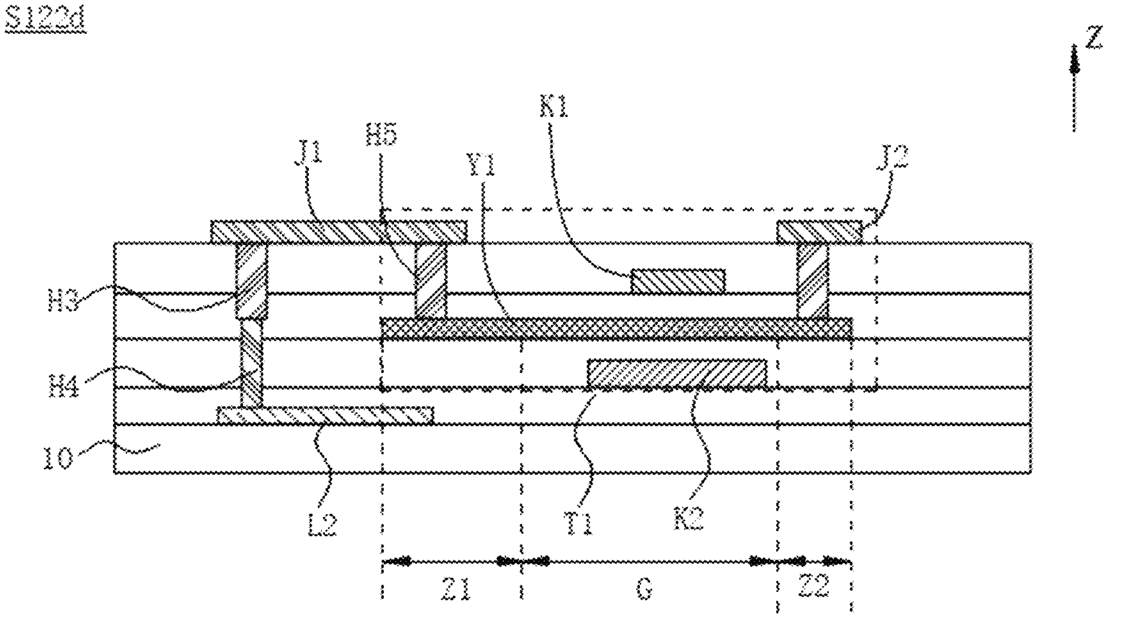

Referring to FIG. 27*d*, in step S122*d*, the first electrode J1 of the first transistor T1 is coupled to the sensing reading signal line L2 through the third via H3 and the fourth via H4, and is coupled to the first doped region Z1 of the first active structure Y1 through the fifth via H5.

In the embodiments of the present application, the coupling between the first electrode J1 and the sensing reading signal line L2 is achieved by the hole digging and etching process after the first insulating layer 61 is prepared, and no additional via structures and corresponding etching processes are required before the first insulating layer 61, which is conducive to simplifying the difficulty of preparing the array substrate.

Figure 28:
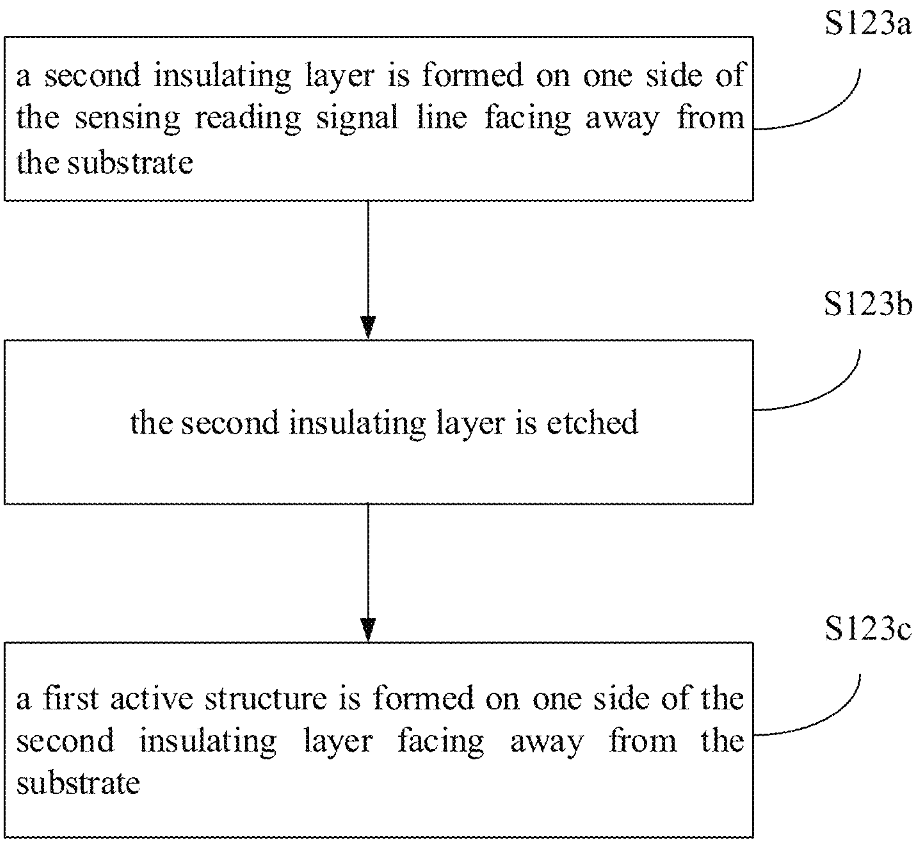
FIG. 28 is a flow chart of another method for preparing the array substrate provided in an embodiment of the present application.

In some embodiments, referring to FIG. 28 and FIG. 29, step S120 includes: S123*a*, S123*b*, and S123*c*.

In S123*a*: a second insulating layer is formed on one side of the sensing reading signal line facing away from the substrate.

Figure 29A:
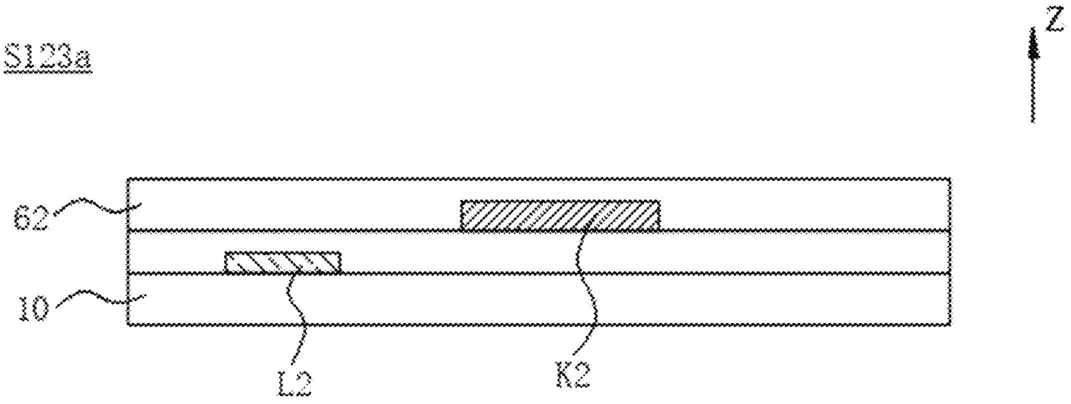
FIG. 29*a* to FIG. 29*c* are schematic process structural diagrams of another method for preparing the array substrate provided in an embodiment of the present application.

Referring to FIG. 29*a*, in step S123*a*, the second insulating layer 62 may be a film layer arranged in contact with the sensing reading signal line L2, and the second insulating layer 62 includes an insulating material and is arranged to cover the sensing reading signal line L2.

In S123*b*: the second insulating layer is etched.

Figure 29B:
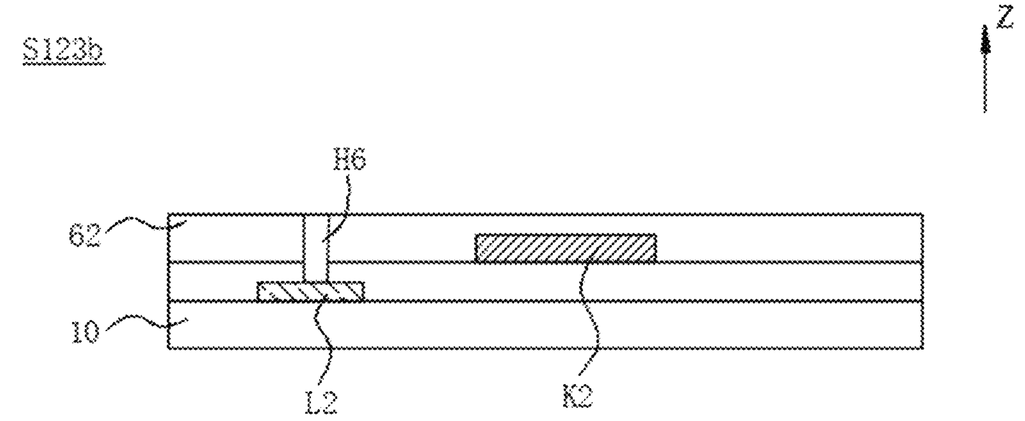

Referring to FIG. 29*b*, in step S123*b*, a sixth via H6 connected to the sensing reading signal line L2 can be formed by an etching process, that is, an orthographic projection of the sixth via H6 on the substrate 10 overlaps the orthographic projection of the sensing reading signal line L2 on the substrate 10.

In S123*c*: a first active structure is formed on one side of the second insulating layer facing away from the substrate.

Figure 29C:
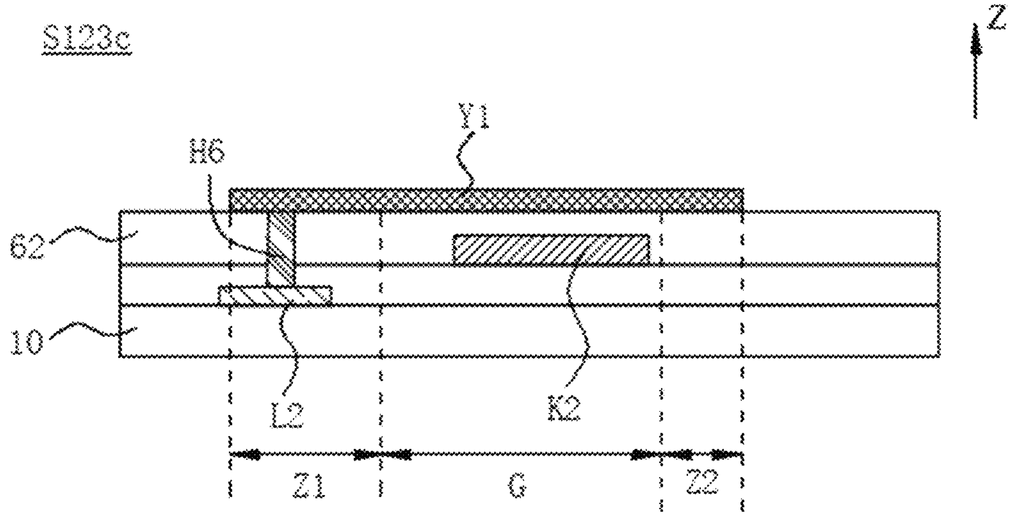

Referring to FIG. 29*c*, in step S123*c*, the first doped region Z1 in the first active structure Y1 is coupled to the sensing reading signal line L2 through the sixth via H6.

In the embodiments of the present application, the first electrode J1 coupled to the first doped region Z1 in the first active structure Y1 can be removed, and the direct coupling connection between the doped region of the first active structure Y1 and the sensing reading signal line L2 can be realized by means of the sixth via H6, which is conducive to reducing the conductor density corresponding to the film layer where the first electrode J1 is located, and reducing the difficulty of internal layout of the array substrate.

Although the embodiments disclosed in the present application are as above, the contents described are only embodiments adopted for the convenience of understanding the present application, and are not used to limit the present application. Any technician in the technical field to which the present application belongs can make any modifications and changes in the form and details of implementation without departing from the gist and scope disclosed in the present application, but the protection scope of the present application shall still be subject to the scope defined in the attached claims.

The above is only a specific implementation method of the present application. The skilled in the art can clearly understand that for the convenience and simplicity of description, the replacement of other connection methods described above can refer to the corresponding process in the aforementioned method embodiments, which are not repeated here. It should be understood that the scope of protection of the present application is not limited to this. Any technician familiar with this technical field can easily think of various equivalent modifications or replacements within the technical scope disclosed in the present application, and these modifications or replacements should be covered within the scope of protection of the present application.

What is claimed is:

1. An array substrate, comprising:

a plurality of light-emitting driving circuits, the light-emitting driving circuit comprising at least one first trace, the at least one first trace configured to receive a first signal having at least two different potentials;

a plurality of photoelectric sensing circuits, the photoelectric sensing circuit configured to receive a light signal and generate a corresponding photo-generated electrical signal according to the light signal, the photoelectric sensing circuit comprising a sensing reading signal line configured to transmit the photo-generated electrical signal, the at least one first trace and the sensing reading signal line being arranged in different layers; and a substrate and a first metal layer located on a side of the substrate, and the light-emitting driving circuit further comprises a driving transistor, wherein the first metal layer comprises a first power line coupled to a first electrode of the driving transistor, and the sensing reading signal line is located on a side of the first metal layer facing the substrate, wherein the array substrate further comprises a first active layer and a second active layer, the first active layer being located on a side of the substrate facing the first metal layer, and the second active layer being located on a side of the first active layer facing the first metal layer, wherein the photoelectric sensing circuit further comprises a first transistor coupled to the sensing reading signal line, the first transistor comprise a first active structure located in the second active layer; and the driving transistor comprises a second active structure located in the first active layer.

2. The array substrate according to claim 1, wherein the array substrate further comprises a shielding layer located on a side of the first active layer facing the substrate, the shielding layer comprises a shielding trace, an orthographic projection of the shielding trace on the substrate covers an orthographic projection of a channel region of the second active structure on the substrate, the sensing reading signal line is located in the shielding layer, the shielding trace is insulated from the light-emitting driving circuit, and the shielding trace is insulated from the photoelectric sensing circuit, and a material of the shielding layer comprises titanium and aluminum; and the shielding trace is configured with a first power supply voltage; or the driving transistor further comprises a driving control end, the array substrate further comprises a first gate layer, and the sensing reading signal line and the driving control end are located in the first gate layer; or the array substrate further comprises a second gate layer, the photoelectric sensing circuit further comprises a sensing control signal line, the first transistor further comprises a first control end coupled to the sensing control signal line, and the sensing reading signal line and the first control end are located in the second gate layer.

3. The array substrate according to claim 1, wherein a material of the first active layer comprises low-temperature polysilicon, and a material of the second active layer comprises indium gallium zinc oxide;

the array substrate further comprises a second metal layer, the light-emitting driving circuit further comprises a storage capacitor, the storage capacitor includes a first polar plate and a second polar plate that are oppositely arranged, the driving transistor further comprises a driving control end, the first polar plate is coupled to the driving control end, and the first transistor further comprises a second control end configured to adjust a threshold voltage of the first transistor, wherein the second control end and the second polar plate are located in the second metal layer; and the at least one first trace is a data line and is located in the first metal layer.

4. The array substrate according to claim 1, wherein the array substrate further comprises a first active layer located on a side of the substrate facing the first metal layer, wherein the photoelectric sensing circuit further comprises a first transistor coupled to the sensing reading signal line, the first transistor comprises a first active structure, the driving transistor comprises a second active structure, the first active structure and the second active structure are located in the first active layer.

5. The array substrate according to claim 4, wherein a material of the first active layer comprises low-temperature polysilicon; the array substrate further comprises a second metal layer, the light-emitting driving circuit further comprises a storage capacitor, the storage capacitor includes a first polar plate and a second polar plate that are oppositely arranged, the driving transistor further comprises a driving control end, and the first polar plate is coupled to the driving control end, wherein the second polar plate and the sensing reading signal line are located in the second metal layer; and the array substrate further comprises a shielding layer located on a side of the first active layer facing the substrate, and the sensing reading signal line is located in the shielding layer.

6. The array substrate according to claim 4, wherein the array substrate further comprises a first gate layer, the light-emitting driving circuit further comprises at least one switching transistor, the driving transistor further comprises a driving control end, the photoelectric sensing circuit further comprises a sensing control signal line, and the first transistor further comprises a first control end coupled to the sensing control signal line, wherein the at least one first trace comprises a plurality of first traces, the plurality of first traces comprises at least one of a scanning signal line and a light-emitting control line, and the scanning signal line is coupled to a control end of the switching transistor or the light-emitting control line is coupled to the control end of the switching transistor, and the at least one first trace, the driving control end and the first control end are located in the first gate layer.

7. The array substrate according to claim 4, wherein the array substrate further comprises a first gate layer, the driving transistor further comprises a driving control end, the photoelectric sensing circuit further comprises a sensing control signal line, and the first transistor further comprises a first control end coupled to the sensing control signal line, wherein the at least one first trace is a data line and is located in the first metal layer;

the sensing reading signal line, the driving control end and the first control end are located in the first gate layer.

8. The array substrate according to claim 1, wherein the photoelectric sensing circuit further comprises a first transistor, a first electrode of the first transistor is coupled to the sensing reading signal line, the first transistor comprises a first active structure, and a first doped region of the first active structure is coupled to the first electrode of the first transistor, wherein the photoelectric sensing circuit further comprises a first via and a second via, two ends of the first via are coupled to the first electrode of the first transistor and the first doped region of the first active structure respectively, two ends of the second via are coupled to the first doped region of the first active structure and the sensing reading signal line respectively, and an orthographic projection of the second via on the substrate is located within an orthographic projection of the first via on the substrate; or the photoelectric sensing circuit further comprises a third via, a fourth via and a fifth via, two ends of the third via are coupled to the first electrode of the first transistor and the fourth via respectively, two ends of the fourth via are coupled to the third via and the sensing reading signal line respectively, two ends of the fifth via are coupled to the first electrode of the first transistor and the first doped region of the first active structure respectively, and an orthographic projection of the fourth via on the substrate is located within an orthographic projection of the third via on the substrate; or the photoelectric sensing circuit further comprises a sixth via, and two ends of the sixth via are coupled to the first doped region of the first active structure and the sensing reading signal line respectively.

9. The array substrate according to claim 8, wherein an orthographic projection of the first electrode of the first transistor on the substrate and an orthographic projection of the sensing reading signal line on the substrate have an overlapping portion, and the orthographic projection of the first electrode of the first transistor on the substrate and an orthographic projection of the first doped region of the first active structure on the substrate have an overlapping portion, wherein the orthographic projection of the sensing reading signal line on the substrate and the orthographic projection of the first doped region of the first active structure on the substrate have an overlapping portion; or the orthographic projection of the sensing reading signal line on the substrate is at least partially located outside the orthographic projection of the first doped region of the first active structure on the substrate.

10. The array substrate according to claim 8, wherein the orthographic projection of the first electrode of the first transistor on the substrate, the orthographic projection of the first doped region of the first active structure on the substrate, and the orthographic projection of the sensing reading signal line on the substrate have an overlapping portion.

11. The array substrate according to claim 1, wherein the photoelectric sensing circuit further comprises a second transistor, a control end of the second transistor is configured to receive and store photoelectric charges corresponding to the light signal, a first electrode of the second transistor is coupled to a first driving signal line, and the second transistor is configured to be driven by a first fixed voltage on the first driving signal line to output the photo-generated electrical signal corresponding to the photoelectric charges, wherein the first power line extends along a first direction, the first driving signal line extends along a second direction, and the first direction intersects with the second direction;

the array substrate comprises a first active layer, the photoelectric sensing circuit further comprises a first transistor, the first transistor comprises a first active structure located in the first active layer, a first doped region of the first active structure is coupled to the sensing reading signal line, the second transistor comprises a third active structure located in the first active layer, and a first doped region of the third active structure is coupled to the first driving signal line, wherein the first active layer further comprises a conductor portion, the conductor portion is coupled to a second doped region of the first active structure and a second doped region of the third active structure;

the conductor portion, the first active structure and the third active structure are in an integrated structure.

12. The array substrate according to claim 11, wherein the photoelectric sensing circuit further comprises a first transistor, and a first electrode of the first transistor is coupled to the sensing reading signal line, wherein:

the first driving signal line and the first electrode of the first transistor are arranged in a same layer;

the photo-generated electrical signal has a first current value, the photoelectric charges have a second current value, the first current value and the second current value have a predetermined ratio, and the first current value is greater than the second current value.

13. The array substrate according to claim 1, wherein the array substrate further comprises a shielding structure arranged in the same layer as the at least one first trace, the shielding structure has a first orthographic projection on the substrate, and the sensing reading signal line has a second orthographic projection on the substrate, wherein the first orthographic projection and the second orthographic projection at least partially overlap; or the at least one first trace has a third orthographic projection on the substrate, and at least part of the first orthographic projection is located between the second orthographic projection and the third orthographic projection; and wherein the light-emitting driving circuit further comprises a driving transistor, a first electrode of the driving transistor is coupled to a first power line, and the shielding structure and the first power line are configured with a same voltage value, wherein the shielding structure and the first power line are arranged in a same layer.

14. The array substrate according to claim 13, wherein the array substrate has a first area and a second area arranged around a periphery side of the first area, and the shielding structure comprises a plurality of first sub-portions and at least one second sub-portion, wherein the first sub-portions are at least partially arranged in the first area, the first sub-portions and the sensing reading signal line extend in a first direction, a plurality of the first sub-portions are arranged at intervals in a second direction, and the first direction intersects with the second direction; and the second sub-portion is arranged in the second area, the second sub-portion extends along the second direction and is connected with a plurality of the first sub-portions.

15. A display panel, comprising:

an array substrate comprising:

a plurality of light-emitting driving circuits, the light-emitting driving circuit comprising at least one first trace, the at least one first trace configured to receive a first signal having at least two different potentials; and a plurality of photoelectric sensing circuits, the photoelectric sensing circuit configured to receive a light signal and generate a corresponding photo-generated electrical signal according to the light signal, the photoelectric sensing circuit comprising a sensing reading signal line configured to transmit the photo-generated electrical signal, the at least one first trace and the sensing reading signal line being arranged in different layers;

a substrate and a first metal layer located on a side of the substrate, and the light-emitting driving circuit further comprises a driving transistor, wherein the first metal layer comprises a first power line coupled to a first electrode of the driving transistor, and the sensing reading signal line is located on a side of the first metal layer facing the substrate, wherein the array substrate further comprises a first active layer located on a side of the substrate facing the first metal layer, wherein the photoelectric sensing circuit further comprises a first transistor coupled to the sensing reading signal line, the first transistor comprises a first active structure, the driving transistor comprises a second active structure, the first active structure and the second active structure are located in the first active layer.

16. A display device, comprising the display panel according to claim 15.

17. A method for preparing an array substrate, comprising:

forming a sensing reading signal line of a photoelectric sensing circuit on a side of the substrate, wherein the photoelectric sensing circuit is configured to receive a light signal and generate a corresponding photo-generated electrical signal according to the light signal, and the sensing reading signal line is configured to transmit the photo-generated electrical signal; and forming at least one first trace of a light-emitting driving circuit on a side of the sensing reading signal line facing away from or toward the substrate, wherein the at least one first trace is configured to receive a first signal having at least two different potentials, wherein prior to the forming at least one first trace of a light-emitting driving circuit on a side of the sensing reading signal line facing away from or toward the substrate, the method further comprises:

forming a first active structure of a first transistor in the photoelectric sensing circuit on the side of the sensing reading signal line facing away from the substrate, and coupling a first doped region of the first active structure with the sensing reading signal line, wherein the forming a first active structure of a first transistor in the photoelectric sensing circuit on the side of the sensing reading signal line facing away from the substrate, and coupling a first doped region of the first active structure with the sensing reading signal line comprises:

forming the first active structure on the side of the sensing reading signal line facing away from the substrate, wherein an orthographic projection of the first doped region of the first active structure on the substrate overlaps an orthographic projection of the sensing reading signal line on the substrate;

forming a first insulating layer on a side of the first active structure facing away from the substrate;

etching the first insulating layer to form a first via penetrating through the first insulating layer and being connected to the first doped region of the first active structure, and a second via connecting the first via and the sensing reading signal line; and forming a first electrode of the first transistor on a side of the first insulating layer facing away from the substrate, and coupling the first electrode of the first transistor to the first doped region and the sensing reading signal line through the first via and the second via; or wherein the forming a first active structure of a first transistor in the photoelectric sensing circuit on the side of the sensing reading signal line facing away from the substrate, and coupling a first doped region of the first active structure with the sensing reading signal line comprises:

forming the first active structure on the side of the sensing reading signal line facing away from the substrate, wherein an orthographic projection of the sensing reading signal line on the substrate is at least partially located outside an orthographic projection of the first active structure on the substrate;

forming a first insulating layer on the side of the first active structure facing away from the substrate;

etching the first insulating layer to form a third via penetrating through the first insulating layer, a fifth via penetrating through the first insulating layer and being connected to the first doped region of the first active structure, and a fourth via connecting the third via and the sensing reading signal line, and an orthographic projection of the third via on the substrate is located outside an orthographic projection of the first active structure on the substrate; and forming a first electrode of the first transistor on the side of the first insulating layer facing away from the substrate, coupling the first electrode of the first transistor to the sensing reading signal line through the third via and the fourth via, and coupling the first electrode of the first transistor to the first doped region of the first active structure through the fifth via; or wherein the forming a first active structure of a first transistor in the photoelectric sensing circuit on the side of the sensing reading signal line facing away from the substrate, and coupling a first doped region of the first active structure with the sensing reading signal line comprises:

forming a second insulating layer on the side of the sensing reading signal line facing away from the substrate;

etching the second insulating layer to form a sixth via connected to the sensing reading signal line; and forming the first active structure on the side of the second insulating layer facing away from the substrate, and coupling the first doped region of the first active structure to the sensing reading signal line through the sixth via.

* * * * *